US008858224B2

(12) United States Patent
Mungas et al.

(10) Patent No.: US 8,858,224 B2
(45) Date of Patent: Oct. 14, 2014

(54) DETONATION WAVE ARRESTOR

(75) Inventors: Gregory S. Mungas, Mojave, CA (US);
David J. Fisher, Tehachapi, CA (US)

(73) Assignee: Firestar Engineering, LLC, Mojave, CA (US)

( * ) Notice: Subject to any disclaimer, the term of this patent is extended or adjusted under 35 U.S.C. 154(b) by 1055 days.

(21) Appl. No.: 12/831,703

(22) Filed: Jul. 7, 2010

(65) Prior Publication Data

US 2011/0008739 A1 Jan. 13, 2011

Related U.S. Application Data

(60) Provisional application No. 61/223,611, filed on Jul. 7, 2009.

(51) Int. Cl.
F23D 14/82 (2006.01)
F16K 17/40 (2006.01)
F02K 9/56 (2006.01)
F16K 17/36 (2006.01)

(52) U.S. Cl.
CPC ............... F02K 9/566 (2013.01); F16K 17/40 (2013.01); F16K 17/366 (2013.01)
USPC ........................................... 431/346; 60/39.1

(58) Field of Classification Search
USPC .................. 431/346; 60/39.11, 39.1
See application file for complete search history.

(56) References Cited

U.S. PATENT DOCUMENTS

| 1,061,847 A | * | 5/1913 | Ionides | 48/192 |
| 1,102,653 A | | 7/1914 | Goddard | |
| 1,103,503 A | | 7/1914 | Goddard | |
| 1,586,195 A | * | 5/1926 | Hall | 220/88.2 |
| 2,447,086 A | * | 8/1948 | Olson et al. | 48/192 |
| 2,609,281 A | | 9/1952 | Smith | |
| 2,618,540 A | * | 11/1952 | John | 48/180.1 |
| 3,243,272 A | * | 3/1966 | Ludwig | 48/192 |
| 3,266,241 A | | 8/1966 | Jennings | |
| 3,512,556 A | | 5/1970 | McKhann | |
| 3,535,066 A | * | 10/1970 | Wagner | 431/346 |
| 3,607,369 A | | 9/1971 | Batta | |

(Continued)

FOREIGN PATENT DOCUMENTS

| CN | 87103346 | 11/1987 |
| CN | 27998 | 7/2006 |

(Continued)

OTHER PUBLICATIONS

International Searching Authority, International Search Report for PCT/US2010/041234, dated Sep. 3, 2010, 2 pages.

(Continued)

Primary Examiner — Kenneth Rinehart
Assistant Examiner — Jason Lau
(74) Attorney, Agent, or Firm — HolzerIPLaw, PC

(57) ABSTRACT

An apparatus and system disclosed herein provides detonation wave arrestor including a detonation wave deflector and a burst element. The detonation wave arrestor disclosed herein attenuates and defects the propagation of a detonation wave characterized by a supersonic flame front propagation. The detonation wave arrestor provides deflection of detonation wave towards the burst element. The rupture of the burst element provides venting of hot gases remaining from the detonation, thus providing separation and attenuation of combusted gas residuals. The detonation wave arrestor disclosed herein may be used in a combustible fuel delivery system.

25 Claims, 14 Drawing Sheets

(56) References Cited

U.S. PATENT DOCUMENTS

| | | | |
|---|---|---|---|
| 3,719,046 A | | 3/1973 | Sutherland et al. |
| 3,730,049 A | * | 5/1973 | Andrew ............................ 86/1.1 |
| 3,748,111 A | * | 7/1973 | Klose ................................ 8/192 |
| 3,779,714 A | | 12/1973 | Nadkarni et al. |
| 4,045,159 A | | 8/1977 | Nishi et al. |
| 4,398,527 A | | 8/1983 | Rynbrandt |
| 4,446,351 A | | 5/1984 | Kawaguchi et al. |
| 4,458,595 A | | 7/1984 | Gerrish, Jr. et al. |
| 4,673,349 A | | 6/1987 | Abe et al. |
| 4,707,184 A | | 11/1987 | Hashiguchi et al. |
| 4,736,676 A | | 4/1988 | Taylor |
| 4,902,539 A | | 2/1990 | Jackson |
| 4,909,730 A | * | 3/1990 | Roussakis et al. ............. 431/346 |
| 4,963,490 A | | 10/1990 | Churchouse et al. |
| 4,992,233 A | | 2/1991 | Swaroop et al. |
| 5,203,296 A | * | 4/1993 | Hart .......................... 123/198 D |
| 5,305,726 A | | 4/1994 | Scharman et al. |
| 5,364,586 A | | 11/1994 | Trusov et al. |
| 5,466,313 A | | 11/1995 | Brede et al. |
| 5,477,613 A | | 12/1995 | Bales et al. |
| 5,608,179 A | | 3/1997 | Voecks et al. |
| 5,632,319 A | | 5/1997 | Yang et al. |
| 5,738,061 A | | 4/1998 | Kawamura |
| 5,768,885 A | | 6/1998 | Johnson et al. |
| 5,855,827 A | | 1/1999 | Bussing et al. |
| 5,925,837 A | | 7/1999 | Ju et al. |
| 6,047,541 A | | 4/2000 | Hampsten |
| 6,151,887 A | | 11/2000 | Haidn et al. |
| 6,179,608 B1 | * | 1/2001 | Kraemer et al. ................... 431/9 |
| 6,196,164 B1 | * | 3/2001 | Valcic ............................ 122/504 |
| 6,332,907 B1 | | 12/2001 | Brungs |
| 6,336,318 B1 | | 1/2002 | Falce et al. |
| 6,435,211 B2 | * | 8/2002 | Stone et al. ............. 137/601.12 |
| 6,588,199 B2 | | 7/2003 | Stechman, Jr. et al. |
| 6,606,851 B1 | | 8/2003 | Herdy, Jr. et al. |
| 6,779,335 B2 | | 8/2004 | Herdy, Jr. et al. |
| 6,799,417 B2 | | 10/2004 | Hewitt |
| 6,823,831 B2 | * | 11/2004 | Chu et al. .................. 123/198 D |
| 6,834,504 B2 | | 12/2004 | Griffin et al. |
| 6,895,743 B1 | | 5/2005 | McElheran et al. |
| 6,896,512 B2 | | 5/2005 | Rattner et al. |
| 6,915,834 B2 | | 7/2005 | Knott et al. |
| 6,931,832 B2 | | 8/2005 | Berg et al. |
| 6,969,474 B2 | | 11/2005 | Beaty |
| 6,984,273 B1 | | 1/2006 | Martin et al. |
| 7,017,329 B2 | | 3/2006 | Farhangi et al. |
| 7,056,114 B2 | | 6/2006 | Brooker |
| 7,124,574 B2 | | 10/2006 | Horn et al. |
| 7,241,137 B2 | | 7/2007 | Leinemann et al. |
| 7,370,469 B2 | | 5/2008 | Watkins |
| 7,377,948 B2 | | 5/2008 | Faris |
| 7,418,814 B1 | | 9/2008 | Greene |
| 7,451,751 B2 | | 11/2008 | Atherley |
| 7,475,561 B2 | | 1/2009 | Smolko et al. |
| 7,585,381 B1 | | 9/2009 | Zubrin |
| 8,230,673 B2 | | 7/2012 | Mungas et al. |
| 2002/0092290 A1 | | 7/2002 | Herdy, Jr. |
| 2003/0044740 A1 | * | 3/2003 | Brooker ........................ 431/252 |
| 2003/0143151 A1 | | 7/2003 | Diener et al. |
| 2004/0013991 A1 | * | 1/2004 | Miceli ............................ 431/344 |
| 2004/0055277 A1 | | 3/2004 | Kline et al. |
| 2004/0065449 A1 | * | 4/2004 | Brooker ........................... 169/46 |
| 2004/0081783 A1 | | 4/2004 | Prince |
| 2004/0253624 A1 | | 12/2004 | Smith et al. |
| 2005/0126755 A1 | * | 6/2005 | Berry et al. .................. 165/80.3 |
| 2005/0135984 A1 | | 6/2005 | Ferron et al. |
| 2006/0121080 A1 | | 6/2006 | Lye et al. |
| 2007/0169461 A1 | | 7/2007 | Koerner |
| 2008/0173020 A1 | | 7/2008 | Mungas et al. |
| 2008/0179279 A1 | | 7/2008 | Cohen |
| 2008/0209872 A1 | | 9/2008 | Samaras et al. |
| 2009/0071434 A1 | | 3/2009 | MacMillan et al. |
| 2009/0120060 A1 | | 5/2009 | Coste |
| 2009/0126514 A1 | | 5/2009 | Burroughs et al. |
| 2009/0133788 A1 | | 5/2009 | Mungas et al. |
| 2009/0173393 A1 | * | 7/2009 | Grabert et al. ............. 137/68.23 |
| 2009/0260363 A1 | | 10/2009 | Moriarty |
| 2009/0266049 A1 | | 10/2009 | Mittendorf |
| 2009/0320443 A1 | | 12/2009 | Geisler et al. |

FOREIGN PATENT DOCUMENTS

| | | |
|---|---|---|
| CN | 2799873 | 7/2006 |
| EP | 1500880 A2 | 1/2005 |
| GB | 1029894 | 5/1996 |
| JP | 62-174554 | 7/1987 |
| JP | 06-241119 | 8/1994 |
| JP | 06241119 A | 8/1994 |
| JP | 06-341776 | 12/1994 |
| JP | 11-006602 | 1/1999 |
| JP | 11-190595 | 7/1999 |
| JP | 2004-233043 | 8/2004 |
| JP | 2008-274937 | 11/2008 |
| WO | 0151433 A1 | 7/2001 |
| WO | 03028069 A2 | 4/2003 |
| WO | 2004089564 A1 | 10/2004 |
| WO | 2005037467 A2 | 4/2005 |
| WO | 2007052084 A1 | 5/2007 |

OTHER PUBLICATIONS

International Searching Authority, Written Opinion for PCT/US2010/041234, dated Sep. 3, 2010, 5 pages.
International Searching Authority, U.S. Patent and Trademark Office, Written Opinion for PCT/US2009/067219, dated Aug. 6, 2009, 7 pages.
International Searching Authority, U.S. Patent and Trademark Office; International Search Report for PCT/US11/28400; dated Nov. 21, 2011, 2 pages.
J.D. Anderson, Jr., Modern Compressible Flow with Historical Perspective, Ch. 11: "Numerical Techniques for Steady Supersonic Flow," p. 307-358 (2nd Ed. McGraw-Hill 1990).
Goodwin, D.G., Cantera, www.nsf-combustion.umd.edu/presentations/dgoodwin_speech.pdf, last visited Mar. 26, 2012.
B.J. McBride & S. Gordon, "Computer Program for Calculation of Complex Chemical Equilibrium Composition and Applications: II. Users Manual and Program Description", NASA Reference Publication 1311, Jun. 1996.
Reaction Design, Chemkin 3.0, www.reactiondesign.com/products/open/chemkin.html, last visited Mar. 2, 2012.
G.P. Smith, D.M. Golden, M. Frenklach, N.W. Moriarty, B. Eitenee, M. Goldenberg, C.T. Bowman, R.K. Hanson, S. Song, W.C. Gardiner, V.V. Lissianski, and Z. Qin. GRI-Mech 3.0, available at http://www.me.berkeley.edu/gri_mech/.
International Searching Authority, U.S. Patent and Trademark Office,Written Opinion for PCT/US2011/031137, dated Jun. 20, 2011, 6 pages.
International Searching Authority, U.S. Patent and Trademark Office; Written Opinion, for PCT/US2011/028400; dated Nov. 21, 2011, 4 pages.
International Searching Authority, International Search Report for PCT/US2010/041249, dated Sep. 7, 2010, 2 pages.
International Searching Authority, International Search Report for PCT/US2010/041255, dated Sep. 14, 2010, 2 pages.
International Searching Authority, Written Opinion for PCT/US2010/041249, dated Sep. 7, 2010, 9 pages.
International Searching Authority, Written Opinion for PCT/US2010/041255, dated Sep. 14, 2010, 6 pages.
Kolb et al, "Micro-structured reactors for gas phase reactions," Chemical Engineering Journal (2004), vol. 98, pp. 1-38.
Wood et al., "Porous burners for lean-burn applications," Progress in Energy and Combustion Science (2008), vol. 34, pp. 667-684.
International Searching Authority, Written Opinion for PCT/US2010/041259, dated Nov. 23, 2010, 6 pages.
International Searching Authority, International Search Report for PCT/US2010/041259, dated Nov. 23, 2010, 3 pages.
"aRocket", an amateur rocketry discussion forum on http://exrocktry.net/mailman/listinfo/arocket, Dec. 31, 2009.

(56) References Cited

OTHER PUBLICATIONS

Balasubramanyam, M.S. et al., "Catalytic Ignition of Nitrous Oxide with Propane/Propylene Mixtures for Rocket Motors," 41st AIAA/ASME/SAE/ASEE Joint Propulsion Conference & Exhibit, Jul. 10-13, 2005, Tucson, AZ, AIAA Paper No. AIAA 2005-3919, pp. 1-8.

Boysan, M.E. et al., "Comparison of Different Aspect Ratio Cooling Channel Designs for a Liquid Propellant Rocket Engine," Recent Advances in Space Technologies, 2007, Rast '07, 3rd International Conference, pp. 225-230/.

Burkhardt, W.M. et al., Abstract—"Formed platelets for low cost regeneratively cooled rocket combustion chambers," AIAA, SAE, ASME, and ASEE, Joint Propulsion Conference and Exhibit, 28th, Nashville, TN, Jul. 6-8, 1992, SAO/NASA ADS Physics Abstract Service, http://adsabs.harvard.edu/abs/1992jpnt.confRT . . . B, 2 pages.

Dong (Keun) Kim et al., "Characterization/Modeling of Wire Screen Insulation for Deep-Water Pipes," Proceedings of the 2006 AIAA/ASME Joint Heat Transfer Conference, Jun. 5-8, 2006, San Francisco, CA, AIAA Paper No. AIAA-2006-3135, pp. 1-11.

Haack, David P. et al., "Novel Lightweight Metal Foam Heat Exchangers," http://fuelclellmarkets.com/content/images/articles/white_paperl.pdf, downloaded Jan. 11, 2011, 7 pages.

International Searching Authority, U.S. Patent and Trademark Office; International Search Report for PCT/US2007/086410; dated Oct. 1, 2008, 2 pages.

International Searching Authority, U.S. Patent and Trademark Office; International Search Report for PCT/US2008/083039; dated Mar. 24, 2009, 2 pages.

International Searching Authority, U.S. Patent and Trademark Office; International Search Report for PCT/US2009/067219, dated Aug. 6, 2010, 3 pages.

International Searching Authority, U.S. Patent and Trademark Office; Written Opinion for PCT/US2007/086410; dated Oct. 1, 2008, 7 pages.

International Searching Authority, U.S. Patent and Trademark Office; Written Opinion for PCT/US2008/083039; dated Mar. 24, 2009, 6 pages.

Mahjoob, Shadi et al., "A Synthesis of Fluid and Thermal Transport Models for Metal Foam Heat Exchangers," International Journal of Heat and Mass Transfer 51 (2008), pp. 3701-3711.

Marchi, Carlos Henrique et al., "Numerical Solutions of Flows in Rocket Engines with Regenerative Cooling," published in Numerical Heat Transfer, Part A: Applicaltions, vol. 45, Issue 7, Apr. 2004, pp. 699-717.

Mungas, G. et al., "NOFB Monopropulsion System for Lunar Ascent Vehicle Utilizing Plug Nozzle Ascent Engine," The Johns Hopkins University, Chemical Propulsion Information Analysis Center, 2008.

Naraghi, M.H. et al., Dual Regenerative Cooling Circuits for Liquid Rocket Engines (Preprint), 42nd AIAA/ASME/SAE/ASEE Joint Propulson Conference & Exhibit, Jul. 9-12, 2006, Sacramento, CA, 18 pages.

Raffray, A.R. et al., "Merlot: A Model for Flow and Heat Transfer through Porous Media for High Heat Flux Applications," Fusion Division, Center for Energy Research, University of California, San Diego, La Jolla, CA, Nov. 2001, 32 pages.

Raffray, a.R. et al., "Modeling Flow and Heat Transfer Through Porous Media for High Heat Flux Applications," University of California Energy Institute, Berkeley, CA, Oct. 2002, 19 pages.

Wikipedia, "Nitrous Oxide," http://en.wikipedia.org/wiki/Nitrous_oxide, retrieved Mar. 16, 2010.

Wikipedia, "Rocket engine," http://en.wikipedia.orglwiki/Rocket_engine, retrieved Jul. 21, 2009, 21 pages.

Yuan, K. et al., "Enhancement of Thrust Chamber Cooling with Porous Metal Inserts," 41st AIAA/ASME/SAE/ASEE Joint Propulsion Conference & Exhibit, Jul. 10-13, 2005, Tucson, AZ, 14 pages.

International Searching Authority, International Search Report, PCT/US2011/021917, dated Mar. 14, 2011, 2 pages.

International Searching Authority, Written Opinion, PCT/US021917, dated Mar. 14, 2011, 7 pages.

* cited by examiner

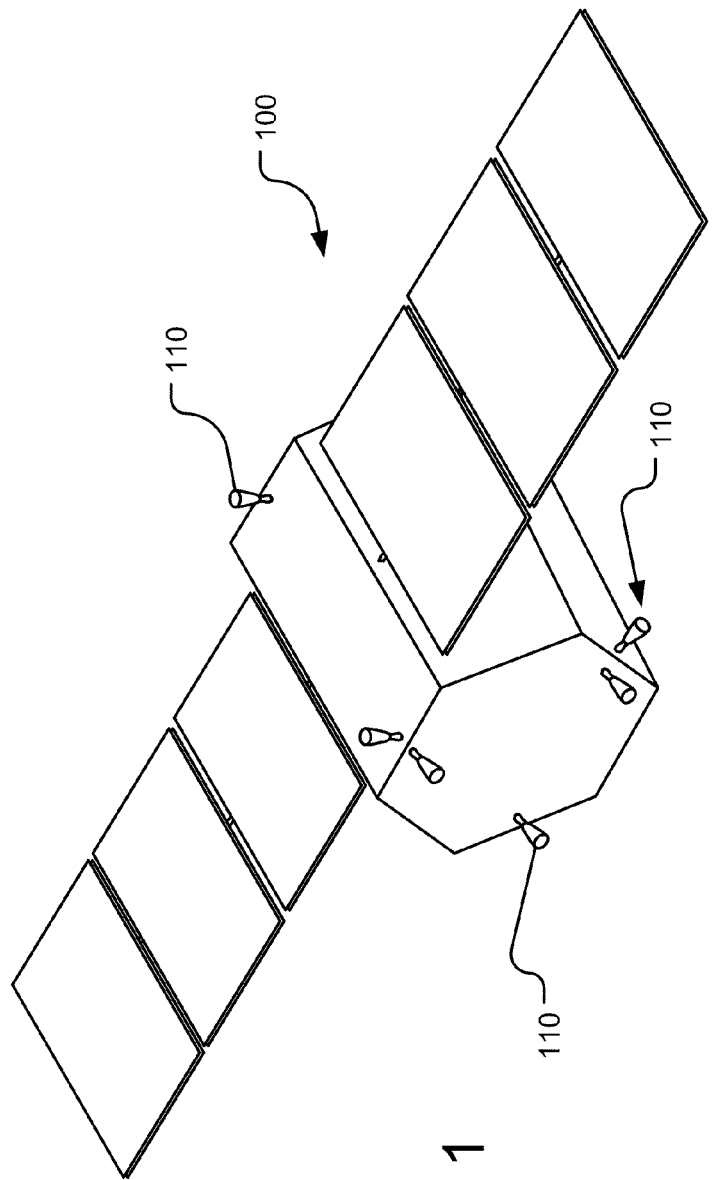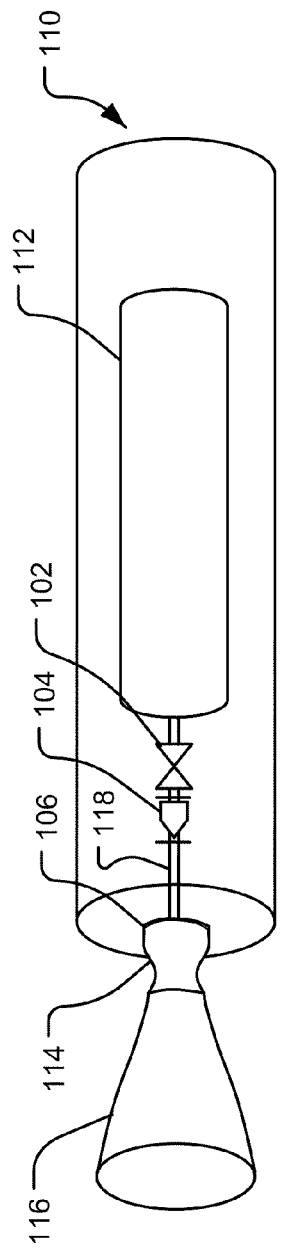

900

Compression Fitting

DETONATION WAVE ARRESTOR

CROSS-REFERENCE TO RELATED APPLICATIONS

The present application claims benefit of priority to U.S. Provisional Patent Application No. 61/223,611, entitled "Propulsion Systems and Components Thereof" and filed on Jul. 7, 2009, which is specifically incorporated by reference herein for all that it discloses or teaches. Further, the present application is related to U.S. patent application Ser. No. 11/950,174, entitled "Spark-Integrated Propellant Injector Head With Flashback Barrier", filed on Dec. 4, 2007 and to U.S. patent application Ser. No. 13/633,770 entitled "Regeneratively Cooled Porous Media Jacket" filed Dec. 8, 2009. Further, the present application is related to: U.S. patent application Ser. No. 12/831,912, entitled "Tiered Porosity Flashback Suppressing Elements For Monopropellant Or Pre-Mixed Bipropellant Systems", U.S. patent application Ser. No. 12/831,767, entitled "Flashback Shut-off", and U.S. patent application Ser. No. 12/831,824, entitled "Aluminum Porous Media", all three of which are filed on Jul. 7, 2010, which are also specifically incorporated by reference herein for all they disclose or teach.

BACKGROUND

Power generation systems often use a finite stored fuel source (e.g., a fuel tank) together with a stored oxidizer source to provide fuel to the power generation system. In such bipropellant rocket systems, it is often desirable to store exact quantities of finite stored fuel source and oxidizer source so that they are exhausted simultaneously during combustion. Considerable time and effort are spent calculating the appropriate quantities of fuel and oxidizer to store on a rocket, measuring consumption of the fuel and oxidizer, and detecting when the fuel and oxidizer are spent. Therefore, a number of power generation systems utilize a stored monopropellant source (or a pre-mixed bipropellant source).

A monopropellant is a single energetic fluid (liquid, gas or a combination of both and sometimes with solid particles entrained) that decomposes to liberate gases and heat. This heated gas can be used to drive other applications (e.g. rocket thrusters, inflation bags, etc). Monopropellants are typically comprised of either a single chemical or, alternatively, mixtures of chemicals that when combined, produce a monopropellant blend. In the monopropellant blend, the constituents most commonly remain well mixed and effectively behave as a single energetic fluid. Many bipropellants (e.g. combination of a fuel and oxidizer such as vaporized fuel and air) when mixed together effectively act as a monopropellant. In one example implementation, the monopropellant is stored as a liquid and decomposes into a hot gas in the presence of an appropriate catalyst, upon introduction of a high-energy spark, or upon introduction of a similar point source ignition mechanism. Example monopropellants include hydrazine, which is often used in spacecraft attitude control jets and hydroxyl ammonium nitrate (HAN). Given the nature of a monopropellant, in an unintentional line ignition of a monopropellant, the monopropellant can act like a fuse and generate combustion waves that can move very rapidly through a fluid conduit or path full of monopropellant. Monopropellants and supply systems for rocket engines and other work producing systems are subject to damage when detonation progresses upstream from a combustion chamber to and through supply lines. Such danger of a flashback from the point of ignition of the monopropellant (or other point along the monopropellant feed line) back to the monopropellant storage tank has prevented the widespread utilization of monopropellants.

Deflagration is a common form of combustion where the flame travels at velocities less than the flame's local speed of sound. Deflagration combustion is most commonly associated with relatively slower burning combustion processes and more commonly seen in lower pressure, lower energy density systems. However, higher energy density systems (such as a high energy density liquid or high-pressure monopropellant gas) with fast chemical decomposition and/or chemical reaction rates may produce a more powerful detonation phenomenon. A detonation is a phenomenon characterized by supersonic flame (which travels at a speed higher than the flame's local speed of sound) front propagation. Usually associated with detonation waves are pressure/temperature spikes and shock waves. The aforementioned conditions can result in a transient phenomenon containing immense power that can be used for destructive or carefully controlled constructive purposes.

Rocket engines, gas generators, power plants, etc., can operate with monopropellants that can have very high gas and/or liquid local combustible energy densities and/or chemical decomposition rates as compared to the energy densities and chemical reaction rates of more conventional bipropellants (e.g., air/fuel mixtures or low-pressure fuel and oxidizer mixtures). Protecting against the detonation wave generated by potential flashback caused in such a system containing monopropellants with very high gas and/or liquid densities is a significant technical challenge.

SUMMARY

Among other things, implementations described and claimed herein address the foregoing problems by providing a detonation wave arrestor for deflecting and attenuating detonation waves. An implementation of the detonation wave arrestor disclosed herein includes a detonation wave deflector and a burst element. The detonation wave arrestor disclosed herein attenuates and defects the propagation of a detonation wave characterized by a supersonic flame front propagation. The detonation wave arrestor deflects the detonation wave towards the burst element. The rupture of the burst element provides venting of hot gases remaining from the detonation, thus providing separation and attenuation of combusted gas residuals. The detonation wave arrestor disclosed herein may be used in a combustible fuel or propellant delivery system.

In an alternate embodiment, the burst membrane is further configured to at least partially surround the detonation wave deflector. In yet another embodiment, the detonation wave deflector and the burst membrane are configured to form a series of flow paths between the detonation wave deflector and the burst membrane for flow of the combustible fluid. In yet alternate embodiment, the detonation wave deflector is configured as a single mass comprising a multi-sided base mass portion, and a conical mass portion attached on the top of the base mass and extending towards an apex thereof. In an alternate embodiment, the detonation wave arrestor may further include a flame-arrestor structure, a cap structure, and a connector mechanism adapted to connect the flame-arrestor structure and the cap structure in a manner so as to hold the detonation wave arrestor and the burst membrane in between the flame-arrestor structure and the cap structure.

In an embodiment, the detonation wave arrestor may comprise a detonation wave deflector located in the path of a combustible fluid, and a burst membrane configured to at least partially surround the detonation wave deflector, wherein the burst membrane is configured to allow dissipation of a detonation wave away from the detonation wave deflector. Yet alternatively, the detonation wave arrestor may further comprise a porous media element of varying porous density located adjacent to the base of the detonation wave deflector. In an alternate embodiment, the thermal mass of the detonation wave deflector is configured to prevent dissipation of heat generated from the detonation wave from reaching the porous media element.

In an embodiment, the porous media element may be made of any of aluminum, a ferrous material, a non-ferrous material, and a refractory material. In yet alternate embodiment, the detonation wave deflector is made of at least one of a ferrous material, a non-ferrous material, a refractory material, carbon, and a carbon composite.

An embodiment of the system disclosed herein provides a method of inhibiting propagation of a detonation wave in a combustible fuel delivery system, the method comprising determining location of a flashback arrestor assembly in the path of the combustible fuel, providing a detonation wave deflector configured to deflect the detonation wave towards a burst membrane, and providing the burst membrane in a manner so as to at least partially surround the detonation wave deflector, wherein the burst membrane is configured to break in presence of the detonation wave.

Yet another embodiment of this method provides a porous media element configured to be located adjacent to the base of the multi-sided base mass. Another embodiment of this method provides a shut-off valve removably attached to the burst membrane, wherein the shut-off valve is located in the path of the combustible fluid. In an alternate embodiment of this method, the shut-off valve is configured to shut-off the flow of the combustible fluid upon a rupture in the burst membrane. In yet alternate embodiment, the detonation wave deflector is configured to have a first thermal mass that prevents dissipation of heat generated from the detonation wave from reaching the porous media element.

Other implementations are also described and recited herein.

BRIEF DESCRIPTION OF THE DRAWINGS

A further understanding of the nature and advantages of the present invention may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

FIG. 1 is a perspective schematic view of an orbital or spacecraft with several attitude or apogee thrusters using the presently disclosed flashback-arresting devices.

FIG. 1A is an enlarged schematic cross section of an example monopropellant propulsion system in the orbital vehicle using flashback-arresting devices according to the presently disclosed technology.

DETAILED DESCRIPTIONS

Figure 2:
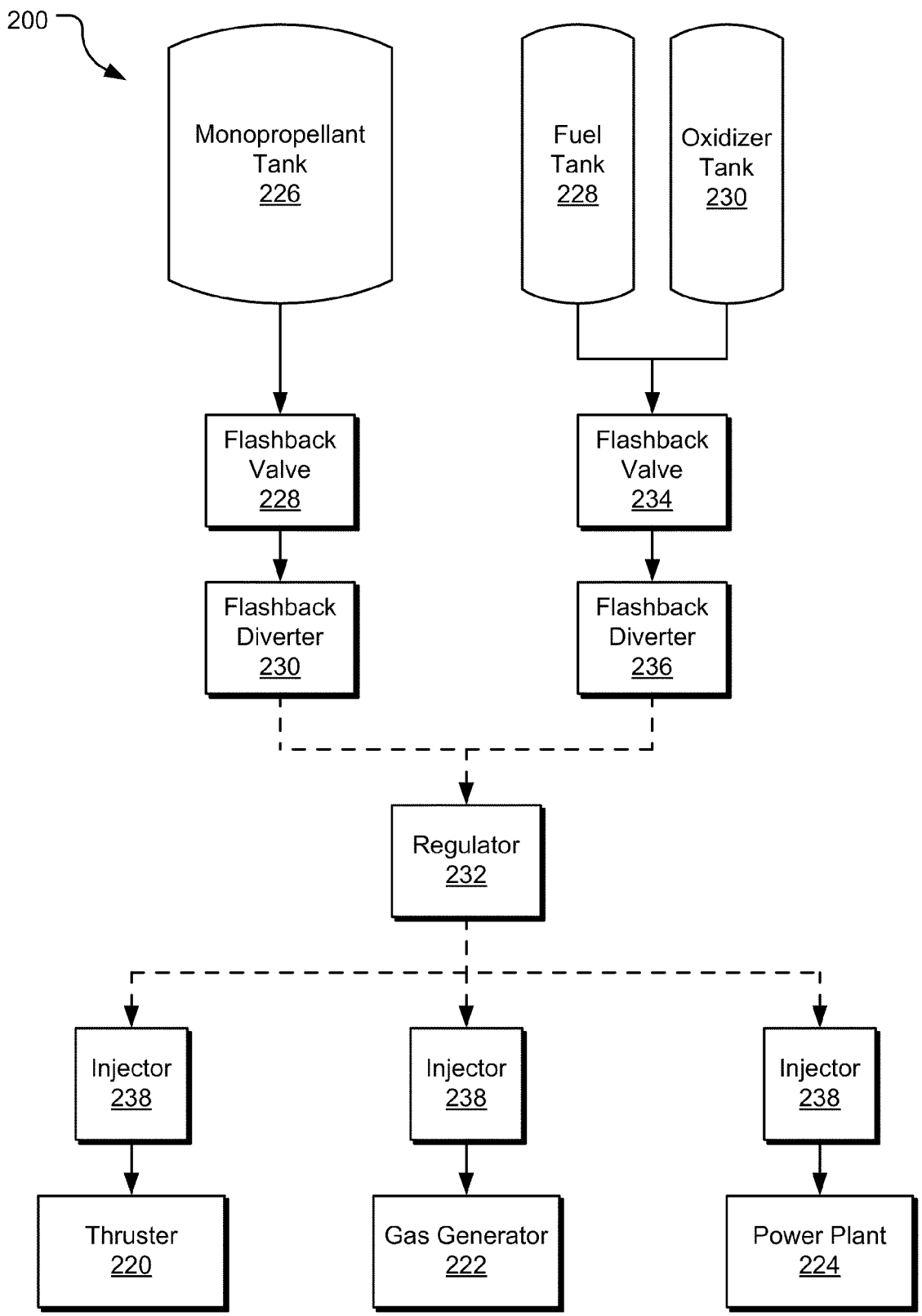
FIG. 2 illustrates an example flowchart for monopropellant or bipropellant systems using detonation-arresting devices for propulsion systems, working fluid production systems, and/or electricity generation systems.

In the following description, for the purposes of explanation, numerous specific details are set forth in order to provide a thorough understanding of the present invention. It will be apparent, however, to one skilled in the art that the present invention may be practiced without some of these specific details. For example, while various features are ascribed to particular embodiments, it should be appreciated that the features described with respect to one embodiment may be incorporated with other embodiments as well. By the same token, however, no single feature or features of any described embodiment should be considered essential to the invention, as other embodiments of the invention may omit such features.

Chemically reacting monopropellants and mixed fuels and oxidizers contain constituents that liberate energy through thermal decomposition and/or combustion. In combustion reactions, the reactants are at a higher energy state than the products remaining following combustion of the reactants. However, a certain quantity of energy (i.e., activation energy) is input to release the energy stored within the chemical bonds of the reactants.

This chemical energy release is often initiated by an ignition source, which provides the activation energy for a selected monopropellant or mixed fuels and oxidizers. The ignition source is typically incorporated near an injector head and within a combustion chamber of a power generation system. Many ignition sources exist including, but not limited to, electrical sparks, catalysts (i.e., substances which lower the activation energy by providing a surface which increases a reaction's chemical kinetics), heat sources, impact loads, compression, or any combination thereof If the ignition source is oriented downstream (i.e., in a direction away from the fluid energy storage device) of a monopropellant or a mixture of fuel(s) and oxidizer(s), flames at the ignition source can propagate upstream (i.e., in a direction towards fluid energy storage) through the feed lines to the point where the fuel(s) and oxidizer(s) are mixed or into a monopropellant storage tank. This event, commonly denoted as a flashback, may cause catastrophic system failure (e.g., destruction of the power generation system, destruction of surrounding equipment, and/or injury or death to nearby personnel).

Flashbacks may take the form of deflagration or detonation wave propagation. Deflagration is a common form of combustion where a flame speed travels at sub-sonic speeds. Deflagration combustion is commonly associated with relatively low energy content and chemical reaction rates. Detonation is a phenomenon characterized by supersonic flame front propagation. Pressure and temperature spikes as well as shock waves are typically associated with detonation waves. Detonation waves contain immense power, which can be very useful in a controlled environment or very destructive in an uncontrolled environment. Conventional flashback arresting devices designed to prevent deflagration flashbacks are often not robust enough to survive detonation flashback waves. Flashback arrestors disclosed herein are specifically configured to effectively prevent and/or control detonation flashback waves as well as deflagration flashbacks.

FIG. 1 is a perspective schematic view of an orbital or spacecraft 100 with several attitude or apogee thrusters using the presently disclosed flashback-arresting devices. The thrusters 110 may use a monopropellant propulsion system 110 that is described below in further detail in FIG. 1A.

FIG. 1A illustrates a cross-sectional view of an example monopropellant propulsion system 110 that may be using flashback-arresting devices 102, 104, 106 according to the presently disclosed technology. The example monopropellant propulsion system 110 includes a monopropellant tank 112. An ignition interface 106 is located between the rocket body 110 and a combustion chamber 114, which feeds into an expansion nozzle 116. In the illustration, the rocket would be propelled from left to right.

Propellant from the monopropellant tank 112 is fed to the combustion chamber 114 via monopropellant lines 118. Flashback-arresting shut-off valve 102 may shut off the fuel in the event of the flashback. A flashback arrestor 104 diverts the energy caused by a flashback away from the lines 118 and tank 112. Flashback-arresting ignition interface 106 may contain a micro-fluidic porous media structure of sintered metal or other heat resistance materials. Further, the shut-off valve 102 and/or the flashback arrestor 104 may also contain a micro-fluidic porous media structure. Note that while the flashback arresting devices 102, 104, 106 are disclosed in FIG. 1 with respect to a rocket, such devices may also be used in other propellant and/or power generation systems.

For example, in an embodiment, materials of variable density or tiered porosity micro-fluidic porous media structures of sintered metal or other materials may be used in the micro-fluidic porous media structure. In one embodiment, such micro-fluidic porous media structure may be made of aluminum.

FIG. 2 illustrates an example flowchart 200 for monopropellant or bipropellant systems using flashback-arresting devices for flashback protection in propulsion systems (e.g., thruster 220), working fluid production systems (e.g., gas generator 222), and/or electricity generation systems (e.g., power plant 224). In a first depicted implementation, monopropellant tank 226 is the fuel/oxidizer source for a power generation system 220, 222, or 224. Flashback valve 228, flashback arrestor 236, and/or regulator 232 contain flashback-arresting technology as presently disclosed. The flashback-arresting technology prevents or stops detonation waves from propagating upstream and causing catastrophic system failure in monopropellant feed lines and/or monopropellant tank 226. Further, the presently disclosed flashback arresting technology (e.g., flashback arrestor 236) may also divert energy of the detonation waves away from the feed lines and/or monopropellant tank 226.

In a second depicted implementation, bipropellant tanks (i.e., fuel tank 228 and oxidizer tank 230) are premixed before injection into the power generation system 220, 222, or 224. Example fuels for such systems include, without limitation, natural gas, gasoline, diesel, kerosene, ethane, ethylene, ethanol, methanol, methane, acetylene, and nitro methane. Example oxidizers for such systems include, without limitation, air, oxygen/inert gas mixtures, oxygen, nitrous oxide, and hydrogen peroxide. Fuel components can be mixed with oxidizing components in many different ratios to obtain a desired combustion reaction. While this figure represents a bipropellant configuration utilizing a separate fuel and oxidizer tank, it should be understood that this basic premise could be applied to mixtures involving more than one fuel and/or oxidizer component as well as additional smaller trace components that may aid in combustion process or provide desirable end results in the resultant gas plumes (e.g. inhibition of undesirable trace gas species such as NOx formation, promotion of fuel/air combustion initiation, promotion of good fuel/air mixing, alteration of fluid species with embedded solid particles).

Flashback valve 234, flashback arrestor 236, and/or the regulator 228 may contain flashback-arresting technology as presently disclosed. The flashback arresting technology prevents or stops detonation waves from propagating upstream towards the tanks 228, 230 and causing catastrophic system failure in feed lines downstream of where fuel is premixed with oxidizer. Further, the presently disclosed flashback arresting technology (e.g., flashback arrestor 236) may also include detonation wave arrestor/diverter to divert energy of the detonation waves away from the feed lines and/or fuel tank 228 and oxidizer tank 230.

Further, FIG. 2 illustrates three alternative power generation systems (i.e., thruster 220, gas generator 222, or power plant 224), each with a corresponding injector head 238. Other power generation systems are also contemplated herein. For example, various work-extracting cycles may implement the flashback arresting technology (e.g., gas turbine (Brayton) cycles, Otto cycles, diesel cycles, and constant pressure cycles). The injectors 238 may also be equipped with the aforementioned flashback arresting technology that prevents or stops detonation waves from propagating upstream of the injectors 234 and causing catastrophic system failure. The implementations shown in FIG. 2 demonstrates the flashback arrestor 236 implemented to protect single ignition source, that is one flashback arrestor for protecting tank 226, and one flashback arrestor 236 to protect the tanks 228, 230. However, in an alternate embodiment, a single flashback arrestor may be implemented to protect multiple sources of combustible mixture. Moreover, the flashback arrestors 236 may be implemented at any point between an ignition source and a container of combustible mixture.

Figure 3:
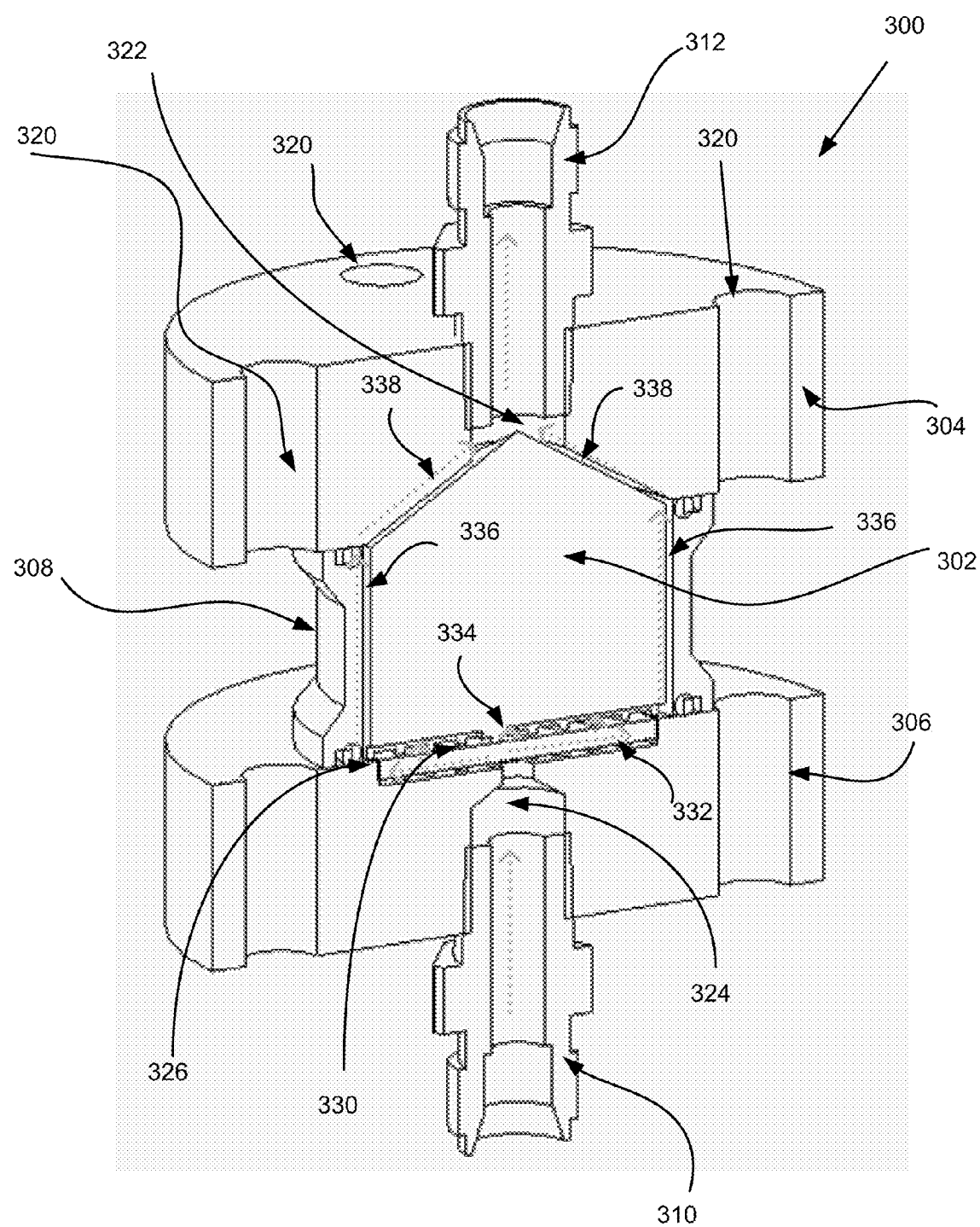
FIG. 3 illustrates an example geometry and composition of a flashback arrestor including an example embodiment of a detonation wave arrestor.

FIG. 3 illustrates an example geometry and composition of an assembly of components of an embodiment of a flashback arrestor assembly 300. The flashback arrestor assembly 300 may include a detonation wave deflector 302, a cap 304, a flame arrestor structure 306, a burst membrane 308, a bottom compression fitting 310, and a top compression fitting 312. A number of screws or other mechanisms may hold together the flashback arrestor assembly 300. For example, in the illustrated embodiment, the cap 304 and the flame arrestor structure 306 have threads 320 for screws that hold together the detonation wave deflector 302 and the burst membrane 308 between the cap 304 and the flame arrestor structure 306. The cap 304 has an opening 322 along its central axis and the flame arrestor structure 306 has an opening 324 along its central axis. In an alternate embodiment, each of the openings 322 and 324 may be located in a direction perpendicular to, or any other direction, the central axis of the cap 304 and the flame arrestor structure 306. In the example implementation of the flashback arrestor 300, the bottom compression fitting 310 connects with the flame arrestor structure 306 via the opening 324 and the top compression fitting 312 connects with the cap 304 via the opening 322.

Each of the bottom compression fitting 310 and the top compression fitting 312 provides a path for fluid (gases, liquids, or a combination thereof) through cavities in their bodies. The bottom compression fitting 310 may be designed so that it may be connected to tubes, pipes or other mechanism designed for transporting a fluid towards the bottom compression fitting 310 from the tanks 226, 228, 230. Similarly, the top compression fitting 312 may be designed so that it may be connected to tubes, pipes or other mechanism designed for transporting a fluid away from the bottom compression fitting 312 towards the injectors 238. The flame arrestor structure 306 may be designed to incorporate a receptor 326 on one of its surface to hold a porous media element 330. Note that while in the embodiment illustrated in FIG. 3, the receptor 326 is shown to have a flat structure, as will be discussed below, receptor 326 may have various alternate geometrical structures. In such alternate embodiments, the porous media element 330 may also have a geometrical structure that is not flat. The detailed designs of the various components of the flashback arrestor assembly 300 are illustrated in further detail below in FIGS. 4-12.

The flashback arrestor assembly 300 is configured to be positioned in the path of fluid from a fluid reservoir such as the tanks 226, 228, 230 to the injectors 238. Thus, the fluid from a tank may travel through a connecting pipe, tube, or other mechanism towards the bottom compression fitting 310. The bottom compression fitting 310 is connected to the flame arrestor structure 306 in a manner so that the fluid from the bottom compression fitting 310 travels towards the receptor 326 containing the porous media element 330. As discussed above, the porous media element 330 allows the fluid to pass through it. Moreover, the fluid may also travel in the direction of the surface of the receptor 326 and thus, perpendicular to the flow of the fluid through the porous media. In FIG. 3, a directional arrow 332 denotes the path of the fluid along the surface of the receptor 326, whereas a directional arrow 334 denotes the path of fluid through the porous media 330.

The bottom surface of the detonation wave deflector 302 is designed so that it deflects the fluid travelling thorough the porous media element 330 towards the periphery of the detonation wave deflector 302. Moreover, the side surface of the detonation wave deflector 302 is designed in a manner so that when the burst membrane 308 is fitted around the detonation wave deflector 302, a number of flow paths are formed along the side surface of the detonation wave deflector 302. The fluid coming from the porous media element 330 and the fluid traveling along the surface of the receptor 326 may travel through such flow paths formed between the detonation wave deflector 302 and the burst membrane 308 towards the cap 304. Directional arrows 336 denote such path of fluid flow between the detonation wave deflector 302 and the burst membrane 308.

Figure 3A:
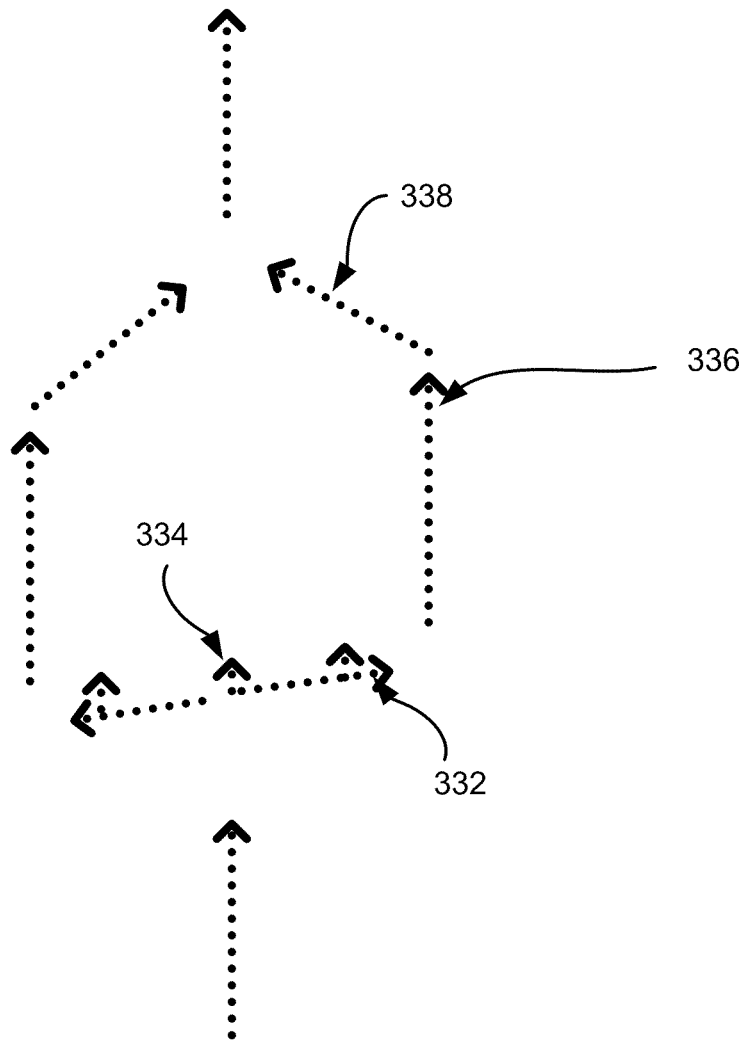
FIG. 3A shows a diagram illustrating the path of fluid though the various components of the detonation wave arrestor of FIG. 3.

The outer surface of the detonation wave deflector 302 that is designed to be adjacent to the cap 304 may also be designed in a manner so as to form a number of flow paths 338 between the detonation wave deflector 302 and the cap 304. The fluid traveling between the detonation wave deflector 302 and the burst membrane 308 along paths 336 may flow though the path 338 towards the central opening in the body of the cap 304. Subsequently, the fluid may flow through the opening in the cap 304 towards the top compression fitting 312 and from there towards a pipe, tube, or other mechanism connecting the top compression fitting to the injector 238. FIG. 3A shows a diagram illustrating the path of fluid though the various components of the flashback arrestor assembly 300.

In an alternate embodiment, the flashback arrestor assembly 300 may be used together with a shut-off valve. For example, a shut-off valve may be placed adjacent to the receptor 326 and attached to the burst membrane 308 so that in the case of a flashback, the shutoff valve closes off the flow of fluid from the tank 226, 228, 230 to the injector 238. As discussed below, such a shut-off valve may be attached to the burst membrane 308 in a manner so as to trigger a shut-off in case of a bursting of the burst membrane 308.

An alternate implementation may provide a propellant shut-off assembly for isolating a propellant source in the event of a flashback, wherein the propellant shut-off assembly may include a burst membrane configured to fail in presence of the flashback and a biased closed shut-off valve attached to the burst membrane. Such a shut-off valve may be held open by the burst membrane while the burst member is intact. Yet another implementation may provide a method of isolating a propellant source in the event a flashback. In such an embodiment, while propellant moves through the propellant shut-off assembly in a propellant flow direction, the propellant shut-off assembly may experience a flashback. As a result, a burst membrane within the propellant shut-off assembly may be fractured to failure because of the flashback. Such a failure of the burst membrane causes the propellant shut-off assembly to close and isolate a propellant source from any components of the propellant delivery system that have failed as a result of the flashback.

Such a shut-off valve may be designed so that it has sufficient force to actuate against highest possible pressures from the flow of combustible fluids from its source. In an embodiment, the closing of the shut-off valve assembly stops the normal flow of the mixture, which will quickly starve a primary source of fuel for a potential post-detonation fire event.

In case of an incident that causes flashback in a system having one or more components of the flashback arrestor assembly 300 positioned in the path of the fluid, generally, the flashback travels in the upstream direction, that is, from an injector towards a tank. Thus, in the absence of the flashback arrestor assembly 300 positioned in the path as described above, the flashback may potentially travel from the direction of the top compression fitting 312 towards the bottom compression fitting 310. However, as further described below, various components of the flashback arrestor assembly 300 assist in deflecting, attenuating, and/or arresting such flashback and the accompanying deflagration and detonation towards the bottom compression fitting 310.

In case of an incident causing flashback, the porous media element 330 operates as a thermal sponge that absorbs combustion energy at rates higher than the rate at which a detonation wave can release combustion energy. As a result, the porous media element 330 provides a detonation quenching. However, because in the normal operation, the porous media element 330 is also providing a path for combustible fluid, the porous media element 330's effective microchannel diameter sizing and surface area are strategically chosen for each particular application based on combustible fluid's energy density, combustion energy release rate, mass flow rate requirements and allowable pressure drop. While the quenching distance of the porous media element 330 may be sufficient to arrest a primary detonation wave, the energy release from a line flashback can cause secondary ignitions through mechanical failures and/or heat transport through solid material. This conductive heat transport can produce hot spots in direct contact with un-combusted combustible fluid sufficient to ignite a propellant upstream of the flashback arrestor assembly 300.

However, the detonation wave deflector 302 together with the burst membrane 308 provides additional protection to the sources of combustible fluids from the potential harm caused by such additional detonation wave. Specifically, the detonation wave deflector 302, together with the burst membrane 308, allows the detonation products travelling from the opening in the top compression fitting 312 to be vented before they reach the porous media element 330 or at least in the immediate vicinity of the porous media element 330. Moreover, the detonation wave deflector 302, when hit by a combustion wave, disperses the shock wave away from the porous media element 330. Specifically, the detonation wave deflector 302 directs the shock wave energy towards the burst membrane 308.

To prevent a secondary ignition from occurring as a result of a detonation wave, the thermal mass of the detonation wave deflector 302 should be sufficient to be able to absorb sufficient thermal energy from the residual hot exhaust gases blowing towards the detonation wave deflector 302 from the opening in the top compression fitting 312. Such a secondary ignition may occur if there were sufficient heat to allow a surface in contact with un-combusted combustible fluid to be elevated to temperatures sufficient for causing thermal ignition. The detonation wave deflector 302 having sufficient thermal mass helps mitigate such secondary ignition mechanism.

The detonation wave deflector 302 can be manufactured a variety of different materials including, ferrous metals, non-ferrous metals, refractory metals, carbon (e.g. graphite, diamond), composites (e.g. carbon fiber composite), and in some cases ceramics. Generally, any material with compressive strength and ability to absorb large impact shock energies is desirable. A high thermal conductivity is also, in general, desirable in order to help absorb thermal energy rapidly. In some embodiments of the detonation wave deflector 302, inert coatings for a particular propellant (e.g. MgO, Al2O3, Yttria) may be applied to allow use of materials that may be catalytic with the propellant without damaging the detonation wave deflector 302.

The addition of the detonation wave deflector 302 in the flashback arrestor assembly 300 also serves the purposes of reducing the volume a combustible fluid can occupy in close proximity to the flashback arresting device, dissipating the shock wave associated with line propagation, and absorbing some quantity of thermal energy from the hot combustion gases resulting from a detonation wave.

As discussed above, the shape of the detonation wave deflector 302 allows it to deflect a detonation and/or a deflagration wave traveling back towards the source of combustible fluid, and therefore, towards the burst membrane 308. The burst membrane 308 may be designed to be the weakest part in the flow path of the detonation and/or a deflagration wave so that the burst membrane 308 will burst and separate when such a spreading detonation wave hits. In an embodiment of the flashback arrestor assembly 300, the burst membrane 308 may be designed to have thin walls, which may be loaded in tension during assembly of the flashback arrestor assembly 300. This tension may be used to hold open a spring-loaded valve assembly (not shown herein) on the flow path further upstream in the flashback arrestor assembly 300. The separation or the breaking of the burst membrane 308 causes further dispersion and venting of the detonation wave and releases the spring-loaded valve assembly to shut off the flow of the combustible mixture from the source.

In an alternate embodiment, an alternative mechanism that is directly and/or indirectly activated by a detonation wave may be used to generate shut-off control. In such an embodiment, the burst membrane 308 may be designed with features to direct separation caused by the detonation wave pressures into certain intended areas. For example, one such feature may be one or more circumferential grooves into the burst membrane 308. In such an embodiment, the lower cross sectional area caused by removal of material to create the grooves offers a separation path where intended. Such grooves may be cut externally and/or internally. In general, these grooves or features similar to the grooves serve two purposes. First, the grooves locally decrease the structural strength in a zone where an intended separation or failure is designed to occur. Secondly, the grooves increase the propellant load similar to a line charge in a location where an intended separation or failure is designed to occur.

The burst membrane 308 can be manufactured out of an array of materials including, without limitation, plastics (e.g. polyethylene), metals (e.g. titanium, aluminum, stainless steel). In an alternate embodiment of the burst membrane 308, inert coatings for a particular propellant (e.g. MgO, Al2O3, Yttria) may be applied to allow use of materials that may be catalytic with the propellant. In general, the burst membrane 308 may designed to accommodate normal feed system operating pressure (including design margin) without failing, but cleanly and reliably fail when exposed to even the weakest of anticipated detonation waves. Detailed description of the burst membrane 308 is provided in further detail below with respect to FIG. 6.

In an alternate embodiment, the flashback arrestor assembly 300 may also be provided with an outer casing surrounding the cap 304, the flame arrestor structure 306, and the burst membrane 308. Such an outer casing (not shown herein) may provide protection to the parts surrounding the flashback arrestor assembly 300 from any debris generated by the bursting of the burst membrane 308. Moreover, such an outer casing may also used to direct the venting of the detonation wave in a more controlled and in a directed fashion. Such an outer casing may be particularly important when the flashback arrestor assembly 300 is used in a location where it is likely to be in close contact with operators, etc.

In an embodiment of the flashback arrestor assembly 300, the porous media element 330 may be made of a sintered-metal and designed to have multiple sufficiently small and convoluted flow paths. Such flow-paths may quench and stop any remnants of a detonation wave and the accompanying shockwaves. In an alternate embodiment, the porous media element 330 may also be of a variable density design. Yet another embodiment may include the porous media element 330 using different micro-channel implementations, and may be configured in different geometries, such as a cup geometry, etc.

Figure 4:
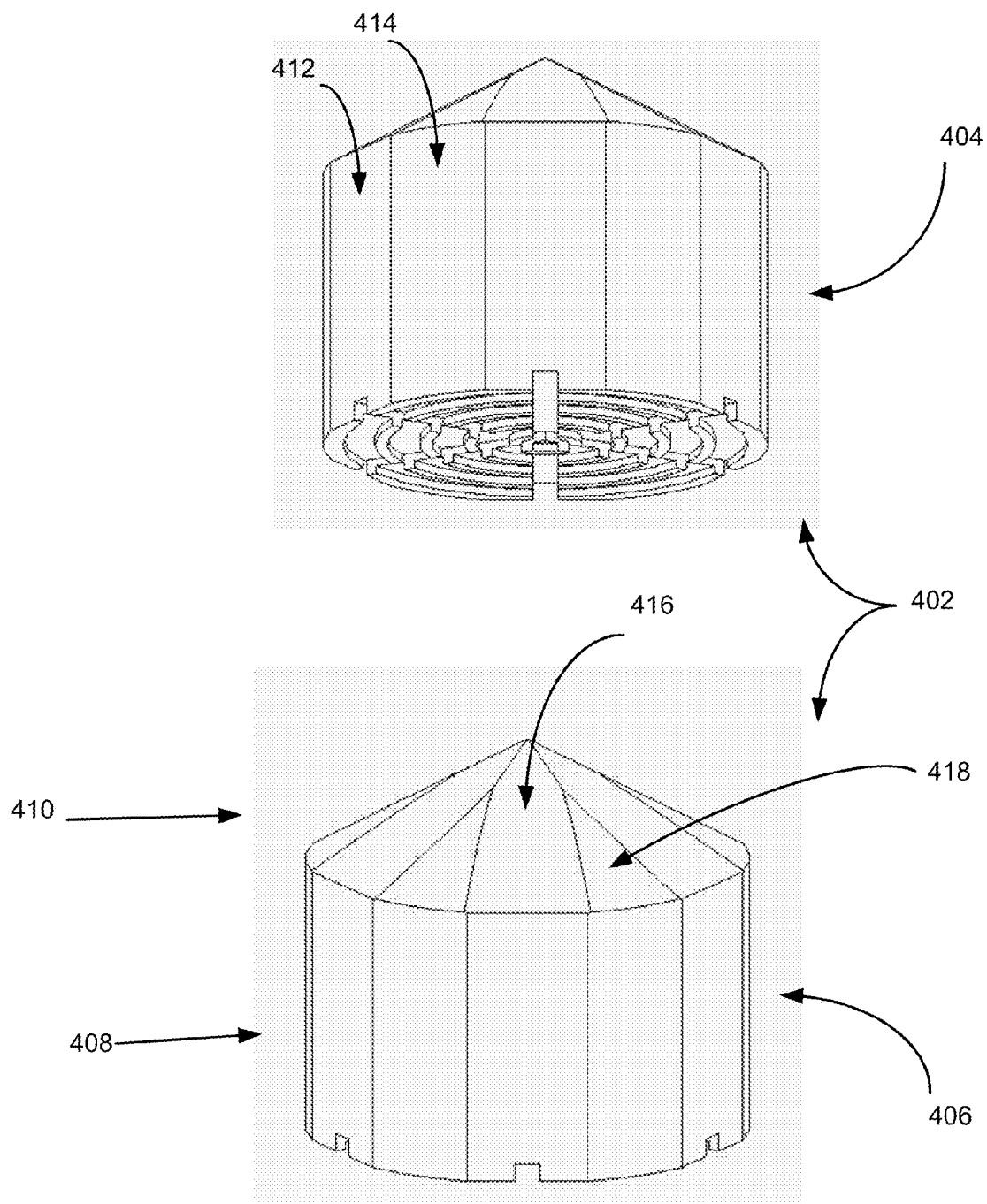
FIG. 4 illustrates a three-dimensional view of a detonation wave deflector used in the detonation wave arrestor of FIG. 3.

FIG. 4 illustrates a three-dimensional view of one embodiment of the detonation wave deflector 402. Specifically, FIG. 4 shows a view of the detonation wave deflector 402 from a bottom angle, referred to hereinafter as the bottom view 404, and a view of the detonation wave deflector 302 from a top angle, referred to hereinafter as the top view 406. The detonation wave deflector 402 is composed of two geometrical masses, a quasi-cylindrical base mass 408, and a conical mass 410 on top of and attached to the quasi-cylindrical base mass 408. Note that such divisional description of the detonation wave deflector 402 is for description purposes only and in practice, the quasi-cylindrical base mass 408, and a conical mass 410 may be made of a single piece of material. Moreover, in an alternate embodiment, one or both of the quasi-cylindrical base mass 408 and the conical mass 410 may be of a different geometrical shape.

The quasi-cylindrical base mass 408 is shown to have an outer surface with twelve flat surfaces, such as a flat surface 412, 414, etc. While the embodiment discussed herein contains six flat surfaces and six sections of a cylinder, an alternate embodiment may have a different number of such flat surfaces. As shown in the bottom view 404, the bottom surface of the detonation wave deflector 402 may have a number of concentric grooves and a number of radial grooves etched in the bottom surface of the quasi-cylindrical base mass 408. Such grooved bottom surface allows the detonation wave deflector 402 to be positioned on top of the flame arrestor structure 306 in a manner so that the concentric and radial grooves may be able to receive flow of combustible fluid from the porous media element 330. Furthermore, these grooves, especially the radial grooves, also direct the flow of the combustible fluid towards the periphery of the detonation wave deflector 302.

The shape of the cylindrical base mass 408 is selected so that even though the outer side surface of the quasi-cylindrical base mass 408 is close to the inner surface of the burst membrane 308, there is still some selective spacing between the outer side surface of the quasi-cylindrical base mass 408 and the inner surface of the burst membrane 308. Such spacing between the quasi-cylindrical base mass 408 and the burst membrane 308 allows upward flow of combustible fluid along the flat surfaces 412, 414 on the side of the quasi-cylindrical base mass 408 towards the top compression fitting 312. Alternatively, portions of the cylindrical mass 408 may mate with the inner surface of the burst membrane 308. The flat surfaces 412 and 414 can provide flow paths while positive locking of the component is made with other concentric surfaces within the burst membrane 308.

As shown in the top view 406, the outer surface of the conical mass 410 may also be provided with a number of flat surfaces. In FIG. 4, the conical mass 410 is shown to have six flat surfaces, such as surfaces 416, 418, on the outer surface of the conical mass 410. However, in an alternate embodiment, an alternate number of such surfaces may be provided. Preferably, the number of flat surfaces on the conical mass 410 may correspond to the number of flat surfaces on the quasi-cylindrical base mass 408.

The shape of the conical mass 410 is configured so that even though the outer side surface of the conical mass 410 is close to the inner bottom surface of the cap 304 (as disclosed below in further detail with respect to FIG. 7), there is still some selective spacing between the outer side surface of the conical mass 410 and the inner bottom surface of the cap 304. Such spacing between the conical mass 410 and the inner bottom surface of the cap 304 allows upward flow of combustible fluid along the flat surfaces 416, 418 on the side of the conical mass 410 towards the top compression fitting 312. Alternatively, portions of the conical mass 410 may mate with the inner bottom surface of the cap 304. The flat surfaces 416 and 418 can provide flow paths while positive locking of the component is made with other surfaces between the flame arrestor structure 306 and cap 304.

Figure 5:
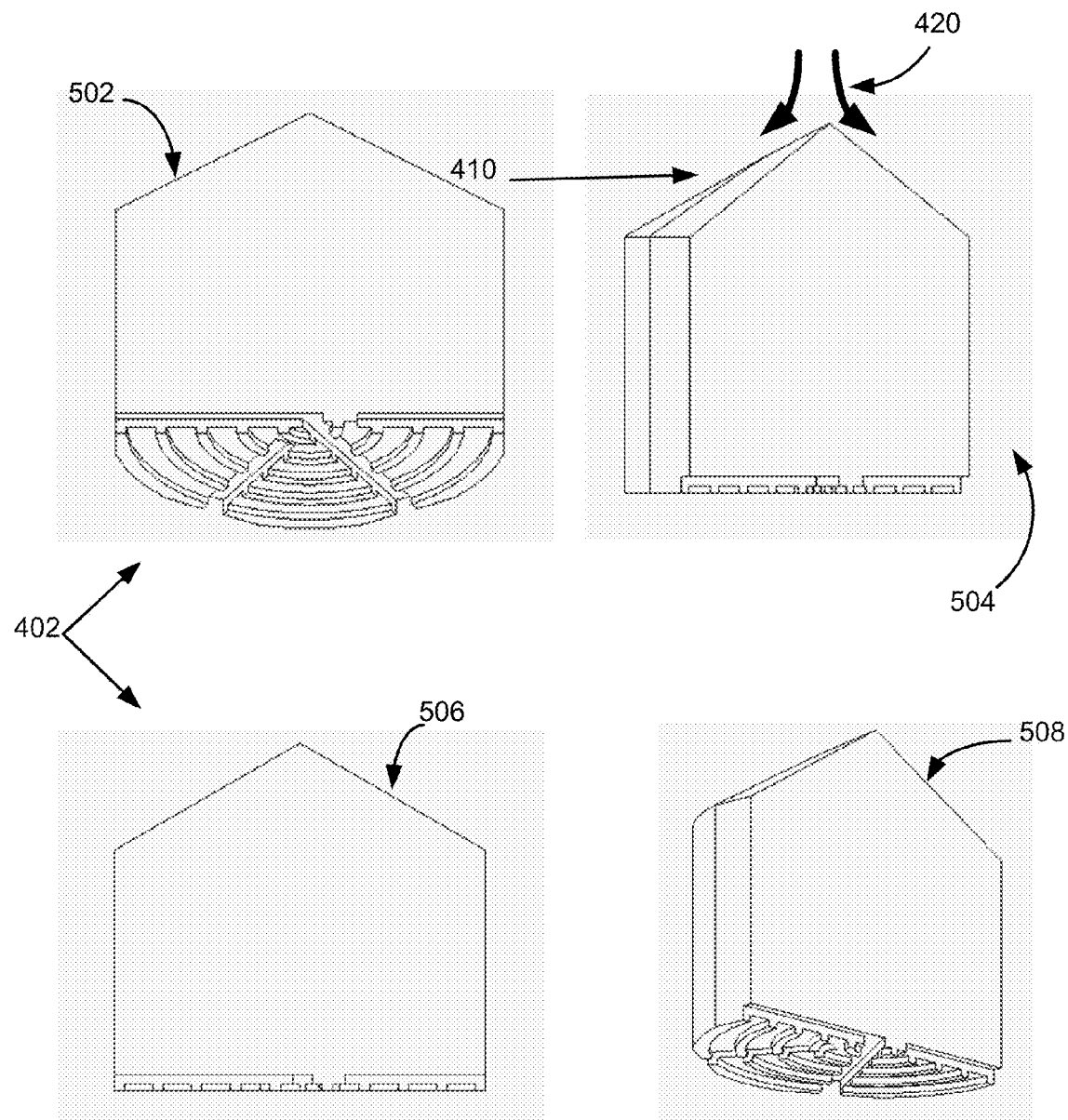
FIG. 5 illustrates various views including three-dimensional views, side-views, and cross-sectional views of the detonation wave deflector of FIG. 4.

FIG. 5 illustrates various views including three-dimensional views, side-views, and cross-sectional views of the detonation wave deflector 402. Specifically, FIG. 5 illustrates a cross-sectional bottom view 502, a cross-sectional side view 504, a cross-sectional front view 506, and a cross-sectional three-dimensional view 508. Each of the various views illustrated in FIG. 5 further illustrate the geometries of the quasi-cylindrical base mass 408, the conical mass 410, the flat surfaces 412, 414, 416, 418, and the radial and the concentric grooves on the bottom surface of the quasi-cylindrical base mass 408. Specifically, the view of the bottom surface of the quasi-cylindrical base mass 408 as shown in FIG. 5 illustrate how these grooves may allow the flow of the combustible fluid towards the outer surface of the detonation wave deflector 302.

The surface of the conical mass 410 of the detonation wave deflector 402 is designed to be first to encounter a potential detonation wave travelling from the top compression fitting 312 towards the detonation wave deflector 402. The conical mass 410 deflects such a detonation wave axially outwards, or away from the central axis of the detonation wave deflector 402, as denoted by the arrows 420 at the top of the conical mass 410.

The height of the detonation wave deflector 402, including the height of the conical mass 410 and the height of the quasi-cylindrical base mass 408, is determined to ensure that the detonation wave deflector 402 has enough thermal mass to absorb enough thermal energy from a detonation wave. An additional feature that contributes to the effectiveness of this design of the detonation wave deflector 402 is the reduction in volume on the unprotected side (towards the bottom surface) of the detonation wave deflector 402 due to the provision of the concentric and axial grooves. In the absence of such grooves, higher volume near the porous media element 330 may cause a failure of the porous media element 330 to occur by shock, pressure, or thermal means.

This design of the detonation wave deflector 402, with the grooves at the bottom surface, provides passages to allow combustible fluid to flow during normal operation. However, surrounding materials can also absorb heat energy from the combustion gases, which causes the materials to increase their temperature. As a result, in the event of flashback or a detonation wave, the same fluid passages may provide path to energy capable of causing a failure of the porous media element 330. The characteristic for a material mass to absorb or release heat for a given temperature change is commonly referred to a body's thermal mass. The thermal mass is a measure of the total energy that can be absorbed by a material per degree change in temperature. For smaller changes in a body's temperature under a given heat load, more thermal mass should be used. In most cases, the thermal mass should be capable of absorbing the bulk of energy that can be expected to interact with the detonation arrestor without reaching a temperature that could cause secondary ignition of the monopropellant.

In general, the volume and thermal mass of the detonation wave deflector 402 should be designed such to reduce the line charge of monopropellant in close proximity to sensitive elements such as the porous media element 330 where the primary detonation event or secondary heating could cause the element to fail. For example, consideration of how post-combusted hot gases can, worst-case, deposit energy into surrounding materials to potentially locally heat materials to a temperature that could cause secondary ignition of the monopropellant needs to be considered. This design for minimal detonation and thermal energy needs to be balanced by the need to allow mass flow rates of monopropellant to nominally travel through the flashback arrestor with minimal pressure drop.

Figure 6:
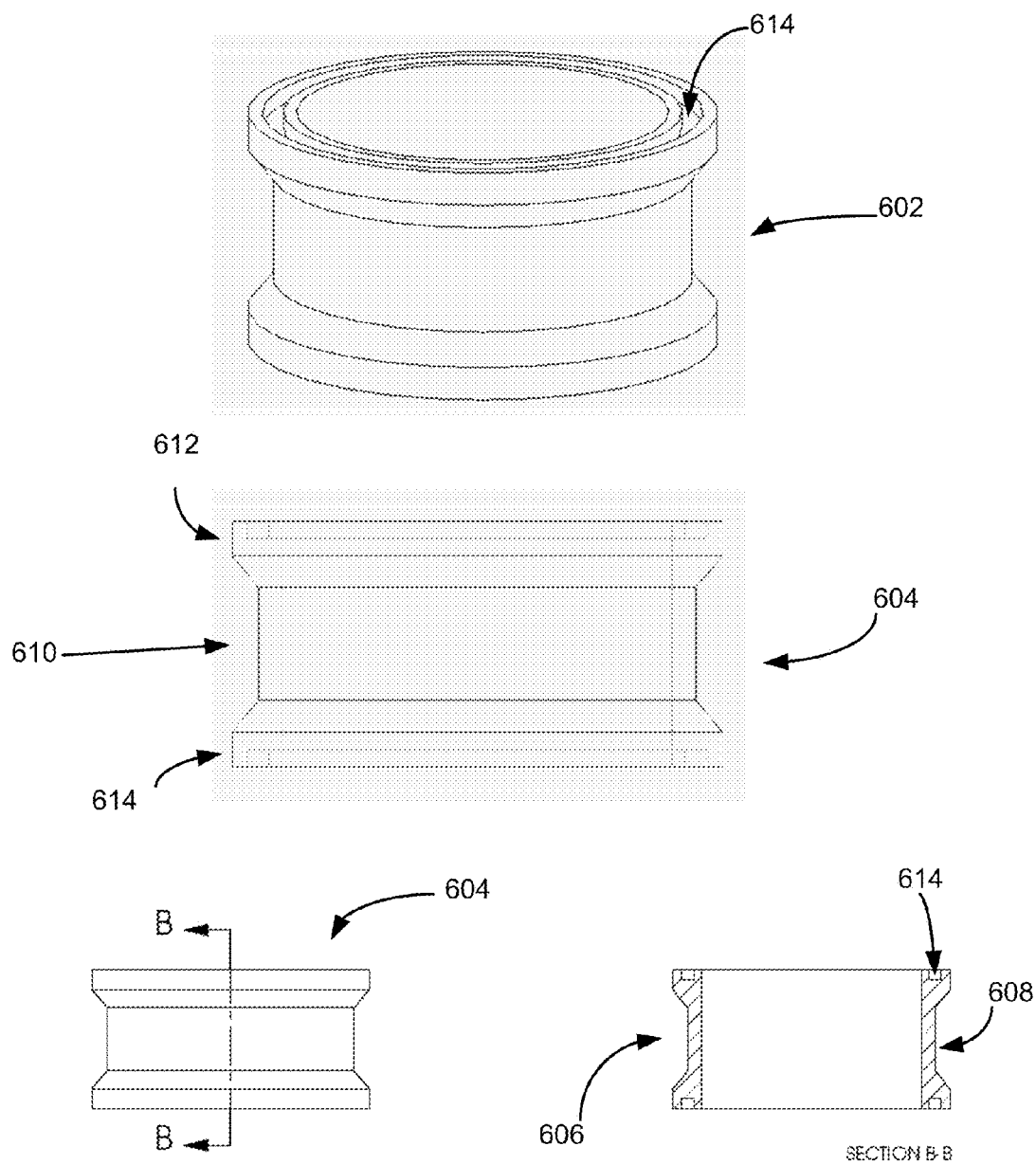
FIG. 6 illustrates various views including three-dimensional views, side-views, and cross-sectional views of a burst membrane used in a detonation wave arrestor.

FIG. 6 illustrates various views including three-dimensional views, side-views, and cross-sectional views of the burst membrane 308. Specifically, FIG. 6 illustrates a three-dimensional view 602, a front view 604, and a cross-sectional view 606 of the burst membrane 308. As shown in FIG. 6, the burst membrane 308 may be designed so that its outer wall 608 has varying thickness along its length. Thus, for example, the outer wall 608 may be thinner towards the center 610 compared to the edges 612, 614. While the burst membrane 308 is illustrated to have a cylindrical shape in FIG. 6, in an alternate embodiment, the burst membrane 308 may be designed to have an alternate shape, such as having a multi-sided (octagonal, etc.) outer surface.

The structure of the burst membrane 308 as illustrated in FIG. 6 causes its outer surface to be less strong towards its middle 610 compared to the edges 612, 614. As a result, when a detonation wave is deflected towards the burst membrane 308, it is more likely to break at the middle 610. Such varying strengths of the burst membrane 308 along its length maybe achieved by using varying thickness of the membrane. However, in an alternate embodiment, such varying strengths of the burst membrane 308 along its length maybe achieved by using a varying mixture of material along the length of the burst membrane 308, by using grooves of varying size along the length of the burst membrane 308, or by some other mechanism.

The combination of the detonation wave deflector 402 having twelve surface flats on its outer surface and the cylindrical shape of the burst membrane 308 creates a series of flow paths between the two. However, in an alternate embodiment, it may be that a detonation wave deflector may be provided with cylindrical outer surface and the inner surface of the burst membrane 308 may have a number of flat surfaces so as to create flow paths between such combination of the detonation wave deflector and the burst membrane 308. The top edge 612 of the burst membrane 308 may also be provided with a groove 614 that allows the burst membrane 608 to be attached to the cap 304. In an embodiment, O-rings may be provided to seal the burst membrane 308 to the cap 304.

Figure 7:
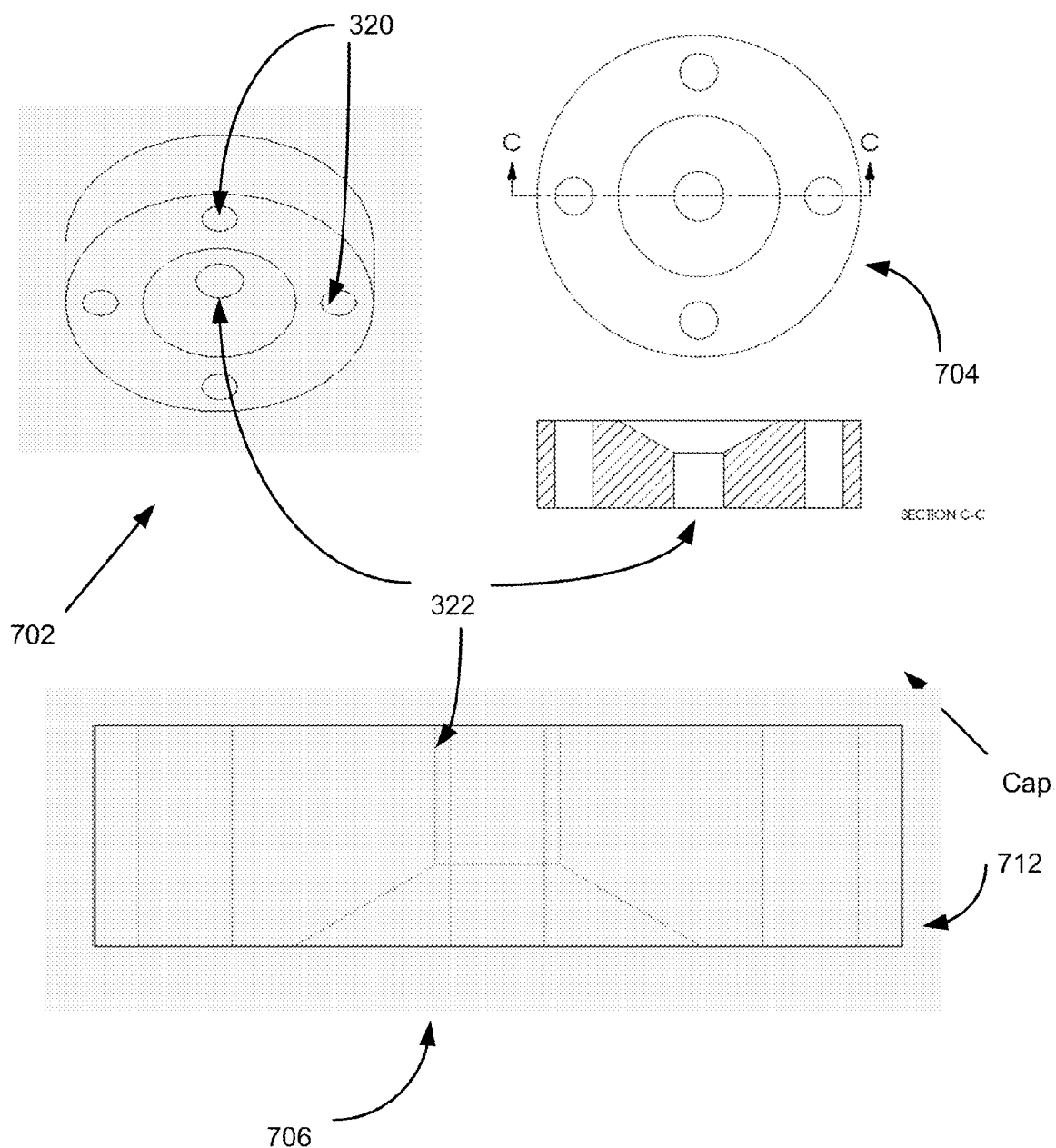
FIG. 7 illustrates various views including three-dimensional views, side-views, and cross-sectional views of a cap structure used with a detonation wave arrestor.

FIG. 7 illustrates various views including three-dimensional views, side-views, and cross-sectional views of a cap 304 used in the flashback arrestor assembly 300. Specifically, FIG. 7 illustrates a three-dimensional view 702, a bottom view 704, and a side view 706 of the cap 304. As shown in FIG. 7, the cap 304 has four threads 320 that may be used to assemble the cap 304 with the flame arrestor structure 306. The cap 304 may also be provided with the axial opening 322 that provides a path for combustible fluids from the bottom compression fitting 310 towards the top compression fitting 312. The axial opening 322 may be at least partially tapered. As shown in FIG. 7, the tapered section 712 of the axial opening 322 is tapered in an outward direction, away from the central axis of the cap 304. The dimensions of the tapered section 312 may be designed so that when the cap structure is fit on top of the detonation wave detector 302, the tapered section 712 is positioned on top of the conical mass 410. Because the outer surface of the conical mass 410 has a number of flat surfaces and the tapered part of the axial opening 322 has a smooth inner surface, together they form a number of flow paths for the combustible fluid. These flow paths also allow a detonation wave to be dissipated away from the axis of the cap and towards the burst membrane surrounding the detonation wave deflector 302. In an alternate embodiment, the non-tapered part of the opening 322, that is, the top part of the opening 322, may be attached to the tapered part of the opening 322 in a non-axial position.

Figure 8:
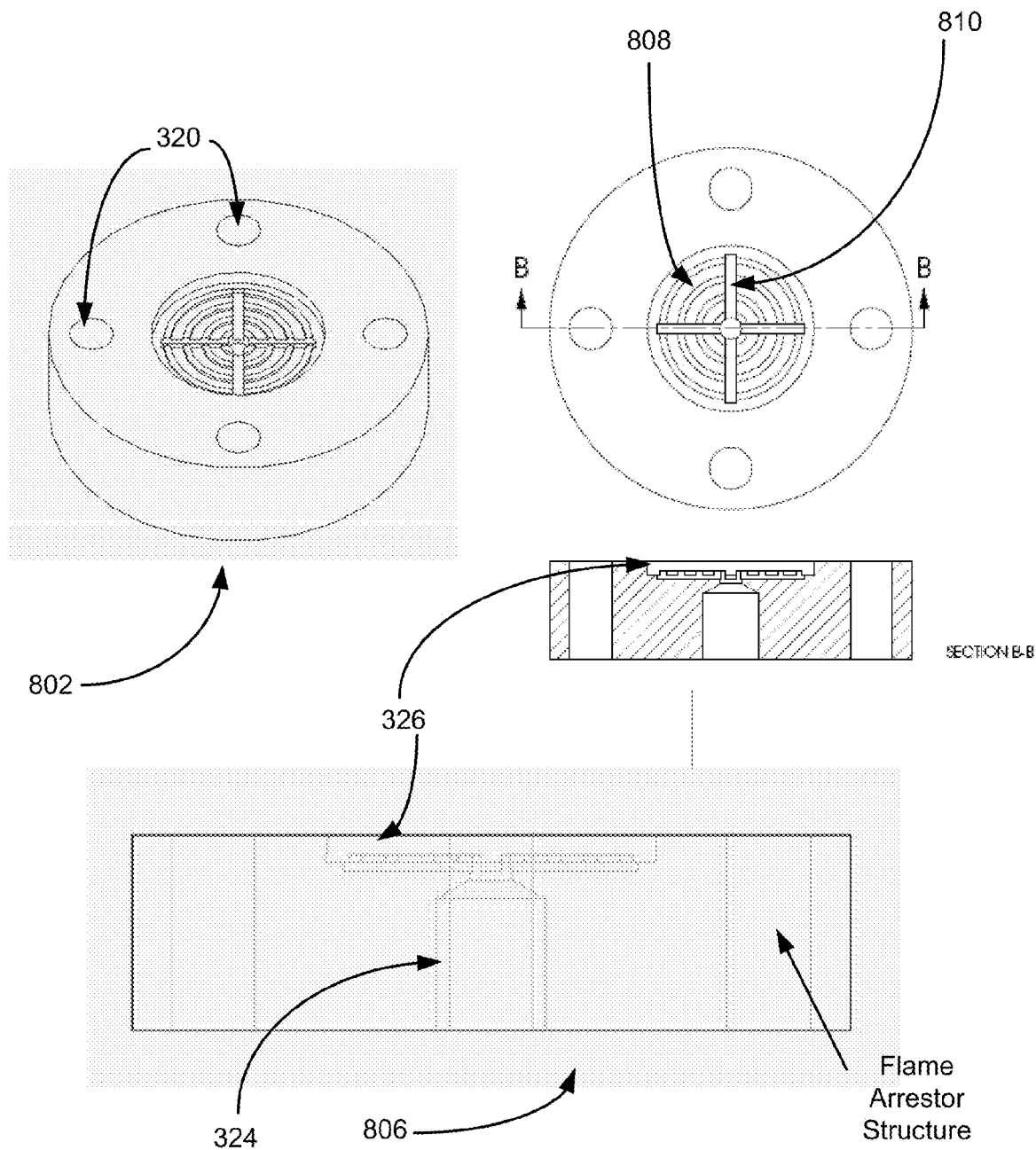
FIG. 8 illustrates various views including three-dimensional views, side-views, and cross-sectional views of a flame arrestor structure used with a detonation wave arrestor.

FIG. 8 illustrates various views including three-dimensional views, side-views, and cross-sectional views of the flame arrestor structure 306 used with the arrestor assembly 300. Specifically, FIG. 8 illustrates a three-dimensional view 802, a top view 804, and a side view 806. As shown in FIG. 8, the flame arrestor structure 306 has four threads 320 that may be used to assemble the flame arrestor structure 306 with the cap 304. The flame arrestor structure 306 also includes the receptor 326 that may be used to receive the porous media element 330. The opening 324 may provide a path for combustible fluid from the bottom compression fitting 310 towards the receptor 330. The bottom surface of the receptor 326 may be provided with a number of concentric grooves 808 and axial grooves 810. These grooves 808, 810 provides various paths for combustible fluid coming from the opening 324 to flow towards the periphery of the porous media element 330, from where, the combustible fluid may flow along the surface flats of the detonation wave deflector 302. In an embodiment of the flame arrestor structure 306, a shut-off valve (not disclosed herein) may be positioned in the opening 324 just below the receptor 326.

Figure 9:
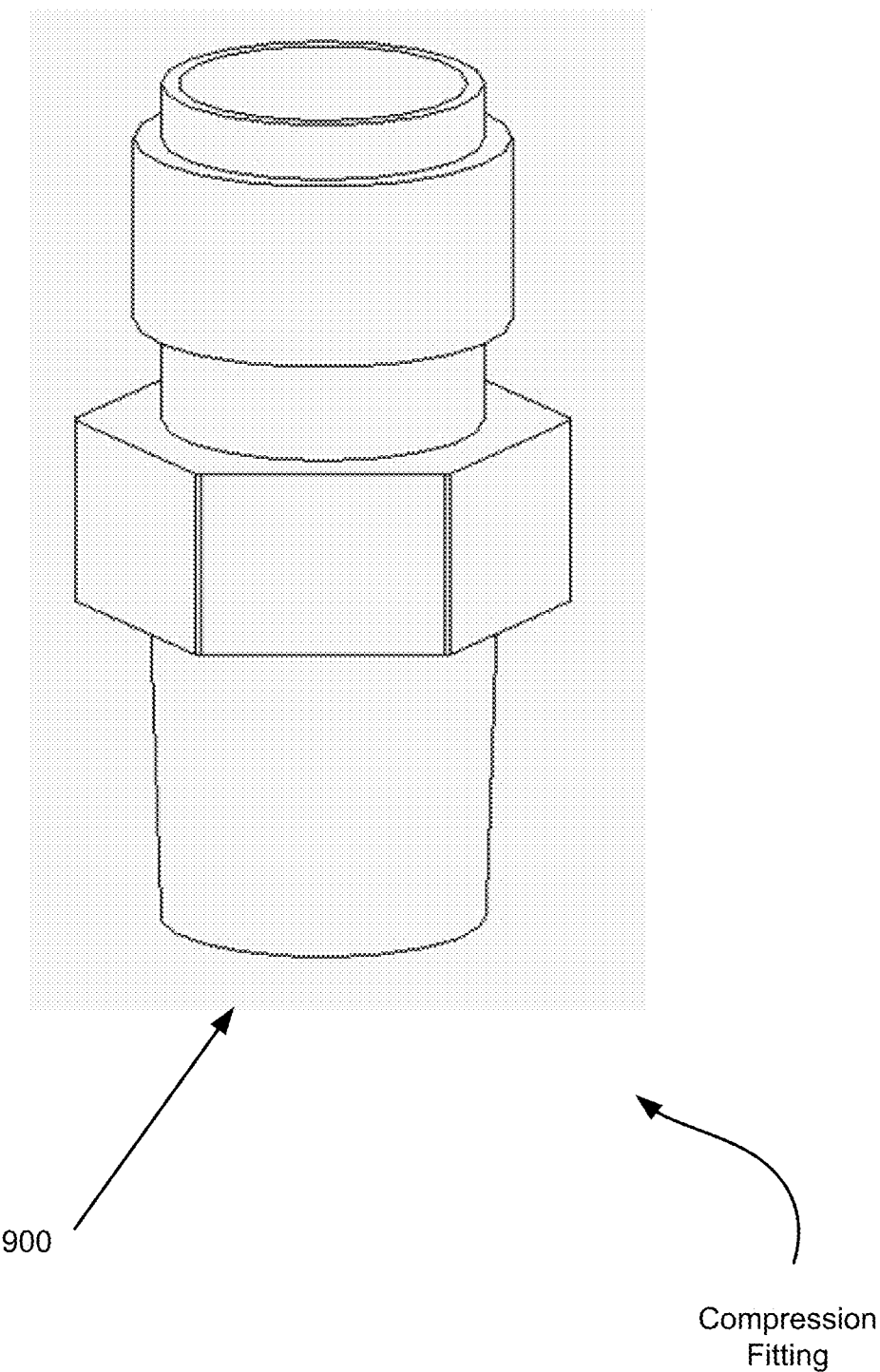
FIG. 9 illustrates a three-dimensional view of a compression fitting structure used with a detonation wave arrestor.

FIG. 9 illustrates a three-dimensional view of a compression fitting structure 900 that may be used with the flashback arrestor assembly 300. The compression fitting structure 900 may be used as the bottom compression fitting 310 or as the top compression fitting 312. The compression fitting structure 900 may be provided with thread or other attaching mechanism on its both ends to attach the flashback arrestor assembly 300 into a feed line for combustible fluid.

Figure 10:
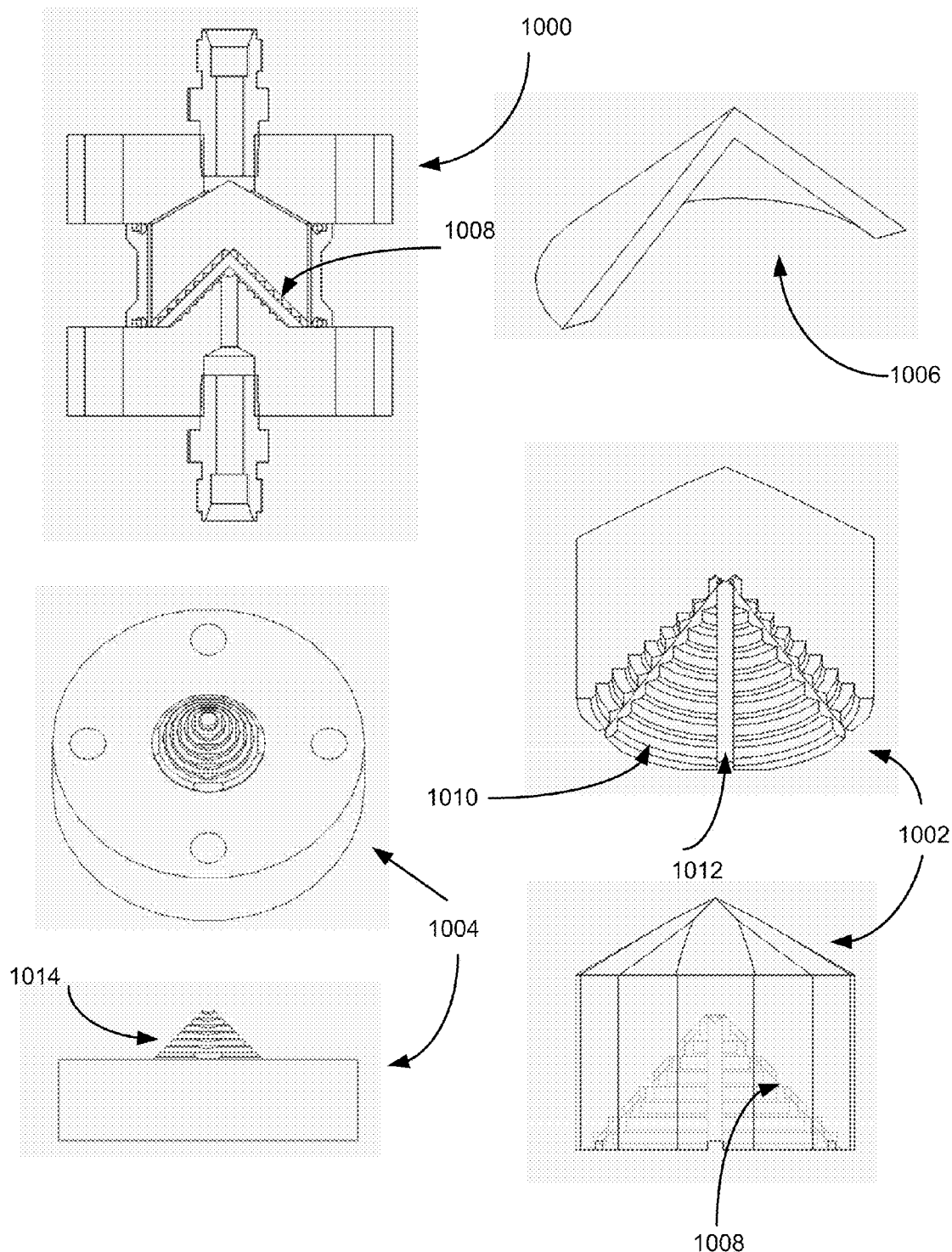
FIG. 10 illustrates an alternate implementation of a flashback arrestor and various components thereof.

FIG. 10 illustrates an alternate implementation of a flashback arrestor assembly 1000 and various components thereof. Specifically, the flashback arrestor assembly 1000 is shown to have a detonation wave deflector 1002 and a flame arrestor structure 1004. The bottom surface of the detonation wave deflector 1002 is designed to have a cone shape. The cone shaped bottom surface 1008 may include a number of circular steps 1010 as well as a number of grooves 1012 expanding outwards from the center of the detonation wave deflector 1002. Similarly, the flame arrestor structure 1004 may have a cone shaped protruding surface 1014 and a number of circular steps on the cone shaped protruding surface 1014 around its central axis. A porous media element 1006 that is shaped in the form of a cone may be positioned between the cone shaped bottom surface of the detonation wave deflector 1002 and the cone shaped protruding surface 1014 of the flame arrestor structure 1004.

Figure 11:
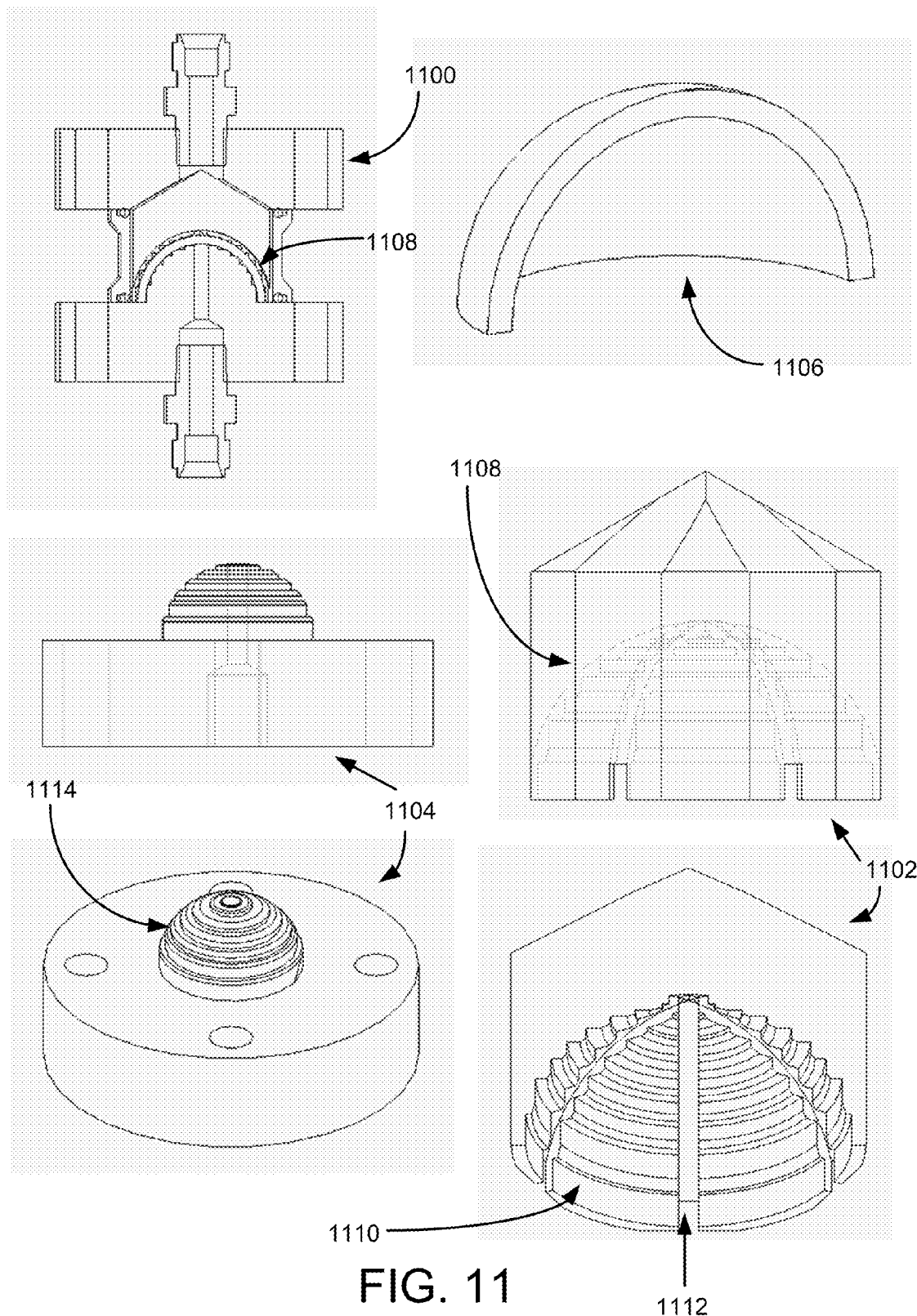
FIG. 11 illustrates yet another alternate implementation of a flashback arrestor and various components thereof.

FIG. 11 illustrates an alternate implementation of a flashback arrestor assembly 1100 and various components thereof. Specifically, the flashback arrestor assembly 1100 is shown to have a detonation wave deflector 1102 and a flame arrestor structure 1104. The bottom surface of the detonation wave deflector 1102 is designed to have a hemi-spherical shape. The hemi-sphere shaped bottom surface 1108 may include a number of circular steps 1110 as well as a number of grooves 1112 expanding outwards from the center of the detonation wave deflector 1102. Similarly, the flame arrestor structure 1104 may have a hemi-sphere shaped protruding surface 1114 and a number of circular steps on the hemi-sphere shaped protruding surface 1114 around its central axis. A porous media element 1106 that is shaped in the form of a hemi-sphere may be positioned between the hemi-sphere shaped bottom surface of the detonation wave deflector 1102 and the hemi-sphere shaped protruding surface 1114 of the flame arrestor structure 1104.

Figure 12:
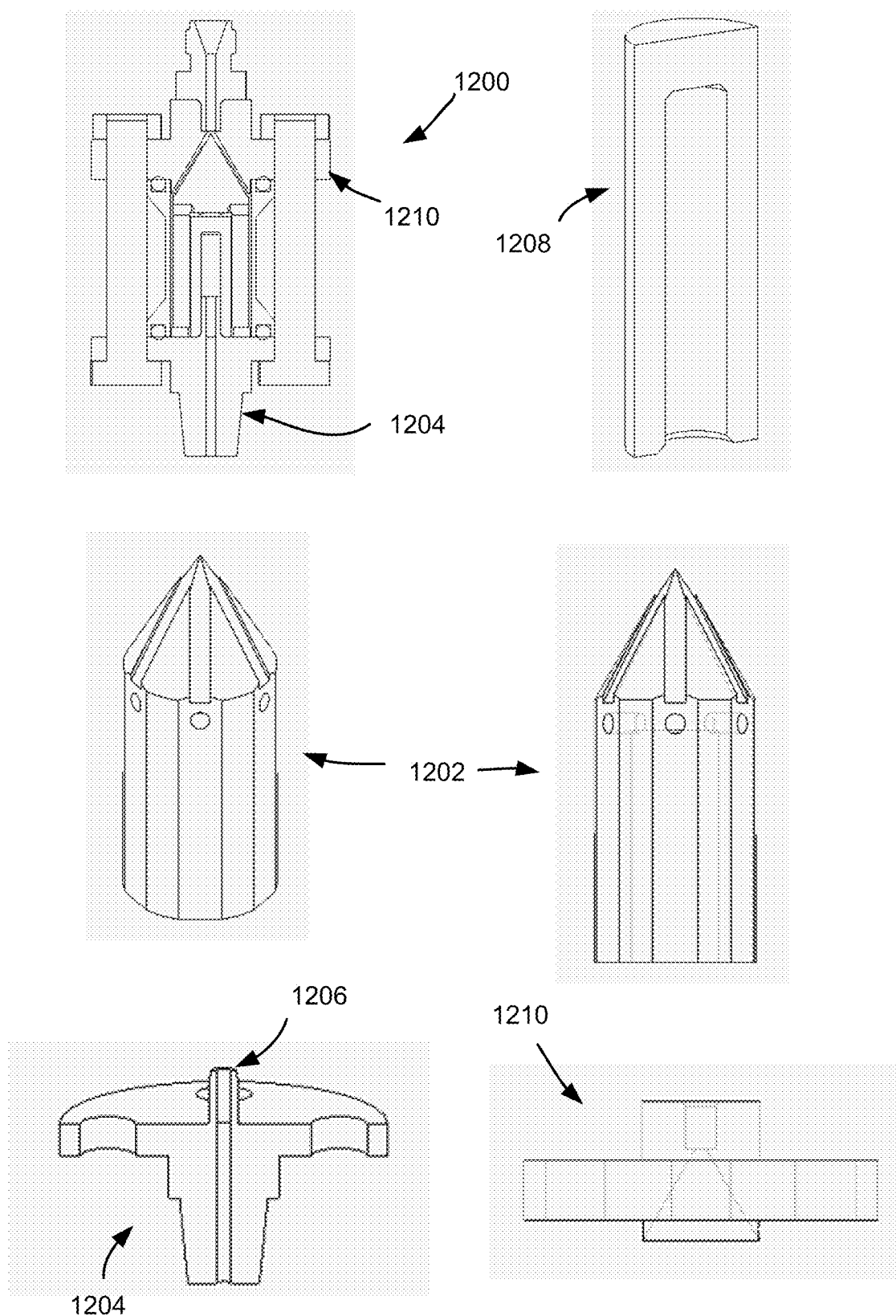
FIG. 12 illustrates yet another alternate implementation of a flashback arrestor and various components thereof.

FIG. 12 illustrates an alternate implementation of a flashback arrestor assembly 1200 and various components thereof. Specifically, the flashback arrestor assembly 1200 is shown to have a detonation wave deflector 1202 and a flame arrestor structure 1204. The bottom surface of the detonation wave deflector 1202 is designed to have an inverted cup shape.

Similarly, the flame arrestor structure 1204 may have a protruding surface 1206. A porous media element 1208 that is shaped in the form of a cup may be positioned between the cup shaped bottom surface of the detonation wave deflector 1202 and the cup shaped protruding surface 1206 of the flame arrestor structure 1204. A cap 1210 may be provided to fit on top of the flashback arrestor assembly 1200.

Figure 13:
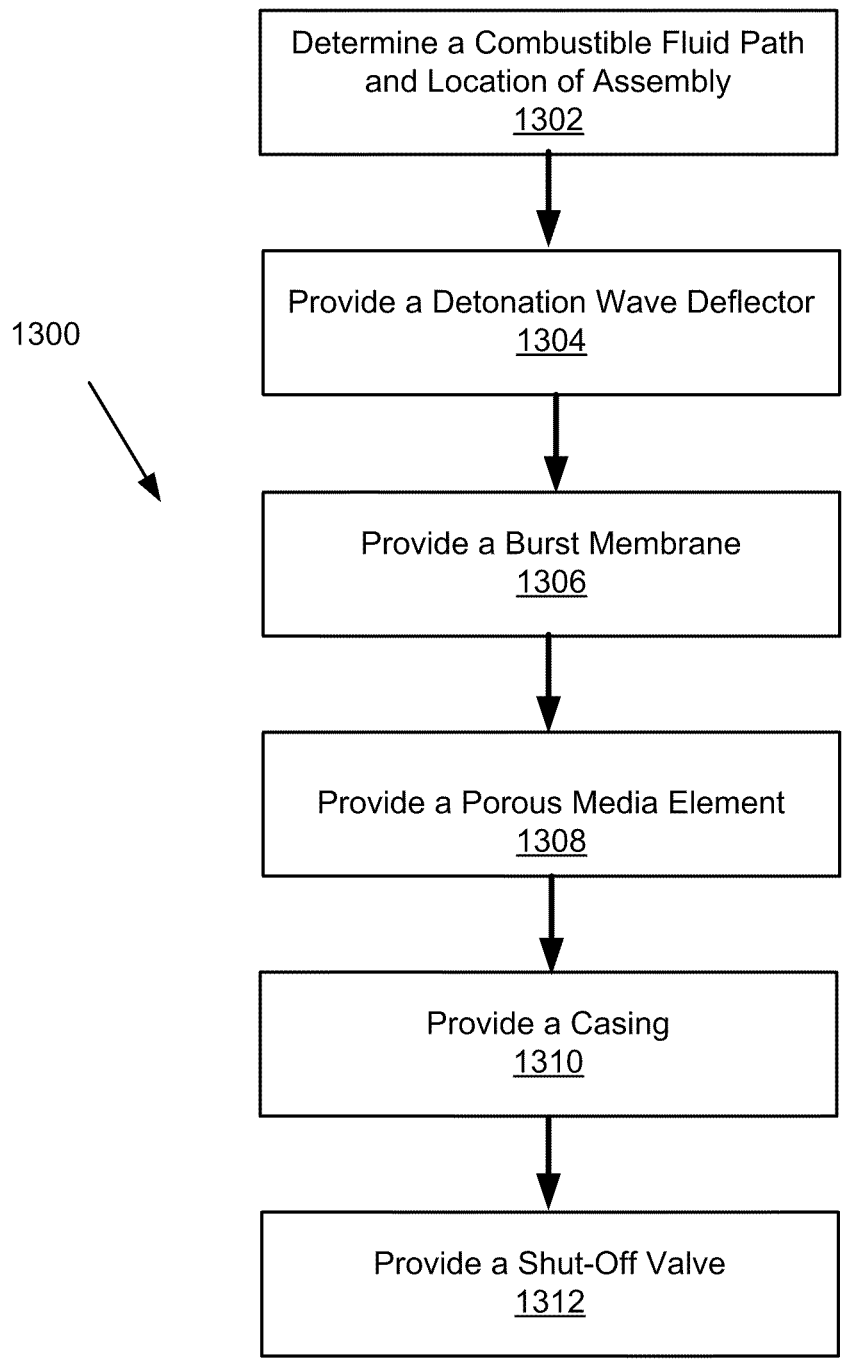
FIG. 13 illustrates a method of providing a flashback arrestor assembly in the path of combustible fluid.

FIG. 13 illustrates a flowchart 1300 for providing a flashback arrestor assembly in the path of combustible fluid. The method provided by the flowchart 1300 may be used for providing a flashback arrestor assembly, such as the flashback arrestor assembly 300 in path of combustible fuel being delivered from the source of the combustible fuel 226, 228, 230 to injector 238. A block 1302 determines the combustible fuel path and the location where the flashback arrestor assembly is to be located. In general, the detonation arrestor should be located immediately downstream of the primary energy storage medium. In a redundant architecture, an additional detonation arrestor would be located immediately upstream of potential ignition sources (e.g. mechanical actuators, combustion chambers).

Once the location of the assembly is determined, block 1304 provides a detonation wave deflector to be located in the path of the combustible fluid. After providing the detonation wave deflector, a block 1306 may provide a burst membrane. In an embodiment, the burst membrane may be provided to at least partially surround the detonation wave deflector. Subsequently, a block 1308 may provide a porous media element that may be located in close proximity to the detonation wave deflector. Thus, for example, in an embodiment, the porous media element may be located to provide a path between the detonation wave deflector and the porous media element that allows for the flow of the combustible fluid.

A block 1310 may provide a casing surrounding the burst membrane. As discussed above, such a casing may be useful in preventing discharge of debris in case the burst membrane is ruptured due to a detonation wave and/or a deflagration. A block 1312 may attach a shut-off valve assembly to the flashback arrestor assembly. In one embodiment, such a shut-off valve may be attached to the burst membrane in a manner so that when the burst membrane breaks, it causes the shutting off the shut-off valve.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. An assembly for inhibiting propagation of a detonation wave in a combustible fuel delivery system, the assembly comprising:
   a detonation wave deflector configured to deflect the detonation wave towards a burst membrane, wherein the burst membrane is configured to break in the presence of the detonation wave and configured to at least partially surround the detonation wave deflector; and
   a shut-off valve removably attached to the burst membrane, wherein the shut-off valve is configured to stop a flow of a combustible fluid through the assembly upon a rupture in the burst membrane.

2. The assembly of claim 1, wherein the detonation wave deflector and the burst membrane are further configured to form a series of flow paths between the detonation wave deflector and the burst membrane for the flow of the combustible fluid.

3. The assembly of claim 1, wherein the detonation wave deflector is further configured as a single mass comprising:
   a multi-sided base mass portion; and
   a conical mass portion attached to a top of the multi-sided base mass portion and extending towards an apex thereof.

4. The assembly of claim 3, wherein the detonation wave deflector includes a series of grooves at a base of the multi-sided base mass portion.

5. The assembly of claim 4, further comprising:
   a porous media element configured to be located adjacent to the groves at the base of the multi-sided base mass portion.

6. The assembly of claim 5, wherein the porous media element is located adjacent to the groves at the base of the multi-sided base mass portion to create a plurality of radial paths for the flow of the combustible fluid.

7. The assembly of claim 5, further comprising:
   a flame-arrestor structure;
   a cap structure; and
   a connector mechanism adapted to connect the flame-arrestor structure and the cap structure in a manner that holds the detonation wave deflector and the burst membrane between the flame-arrestor structure and the cap structure.

8. The assembly of claim 7, wherein the flame-arrestor structure includes a receptor structure to hold the porous media element.

9. The assembly of claim 1, wherein the shut-off valve is located in the path of the combustible fluid.

10. The assembly of claim 1, wherein at least one part of the burst membrane towards its center has a thinner wall as compared to a thickness of the burst membrane towards its edges.

11. The assembly of claim 1, wherein the burst membrane further comprises:
    a plurality of circumferential grooves along a length of the burst membrane.

12. The assembly of claim 11, wherein a thickness of the circumferential grooves varies along a length of the burst membrane.

13. The assembly of claim 1, further comprising:
    a casing surrounding the burst membrane.

14. The assembly of claim 5, wherein the detonation wave deflector has a thermal mass that prevents dissipation of heat generated from the detonation wave from reaching the porous media element.

15. A method of inhibiting propagation of a detonation wave in a combustible fuel delivery system, the method comprising:
    locating a flashback arrestor assembly in a path of the detonation wave;
    deflecting the detonation wave from a detonation wave deflector towards a burst membrane that at least partially surrounds the detonation wave deflector, wherein the burst membrane is configured to break in the presence of the detonation wave; and
    stopping a flow of a combustible fluid through the flashback arrestor assembly by closing a shut-off valve located in a path of the combustible fluid and removably attached to the burst membrane upon a rupture in the burst membrane.

16. The method of claim 15, further comprising:
locating a porous media element adjacent to a base of a multi-sided base mass portion of the detonation wave deflector.

17. The method of claim 15, wherein the detonation wave deflector has a thermal mass that prevents dissipation of heat generated from the detonation wave from reaching the porous media element.

18. A detonation wave arrestor, comprising:
a detonation wave deflector located in a path of a combustible fluid;
a burst membrane configured to at least partially surround the detonation wave deflector, wherein the burst membrane is configured to allow dissipation of a detonation wave away from the detonation wave deflector; and
a shut-off valve removably attached to the burst membrane, wherein the shut-off valve is configured to stop a flow of a combustible fluid upon a rupture in the burst membrane.

19. The detonation wave arrestor of claim 18, further comprising:
a porous media element of varying porous density located adjacent to a base of the detonation wave deflector.

20. The detonation wave arrestor of claim 19, wherein the porous media element is made of aluminum.

21. The detonation wave arrestor of claim 20, wherein a thermal mass of the detonation wave deflector prevents dissipation of heat generated from the detonation wave from reaching the porous media element.

22. The assembly of claim 5, wherein the porous media element is made of aluminum.

23. The detonation wave arrestor of claim 20, wherein the porous media element is made of a plurality of aluminum media elements, with at least two of the plurality of aluminum media elements having different porosity.

24. The detonation wave arrestor of claim 19, wherein the porous media element is made of at least one of a ferrous material, a non-ferrous material, and a refractory material.

25. The detonation wave arrestor of claim 18, wherein the detonation wave deflector is made of at least one of a ferrous material, a non-ferrous material, a refractory material, carbon, and a carbon composite.

* * * * *